(12) United States Patent
Ochiai et al.

(10) Patent No.: US 12,500,395 B2
(45) Date of Patent: Dec. 16, 2025

(54) QUANTUM CASCADE LASER DEVICE

(71) Applicant: HAMAMATSU PHOTONICS K.K., Hamamatsu (JP)

(72) Inventors: Takahide Ochiai, Hamamatsu (JP); Naota Akikusa, Hamamatsu (JP); Kousuke Shibata, Hamamatsu (JP); Nobutaka Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 661 days.

(21) Appl. No.: 17/911,206

(22) PCT Filed: Mar. 15, 2021

(86) PCT No.: PCT/JP2021/010388
§ 371 (c)(1),
(2) Date: Sep. 13, 2022

(87) PCT Pub. No.: WO2021/187421
PCT Pub. Date: Sep. 23, 2021

(65) Prior Publication Data
US 2023/0095425 A1 Mar. 30, 2023

(30) Foreign Application Priority Data
Mar. 18, 2020 (JP) .................. 2020-047383

(51) Int. Cl.
*H01S 5/02253* (2021.01)
*H01S 5/02325* (2021.01)
(Continued)

(52) U.S. Cl.
CPC ........ *H01S 5/3401* (2013.01); *H01S 5/02253* (2021.01); *H01S 5/02325* (2021.01); *H01S 5/02476* (2013.01)

(58) Field of Classification Search
CPC .. H01S 5/022; H01S 5/02253; H01S 5/02257; H01S 5/02326; H01S 5/02216;
(Continued)

(56) References Cited

U.S. PATENT DOCUMENTS 10,985,525 B2 * 4/2021 Kihara ............... G02B 3/00
12,278,463 B2 * 4/2025 Sugiyama ............ H01S 5/141
(Continued)

FOREIGN PATENT DOCUMENTS

CN 101750703 A 6/2010
CN 209215728 U 8/2019
(Continued)

OTHER PUBLICATIONS

International Preliminary Report on Patentability mailed Sep. 29, 2022 for PCT/JP2021/010388.

*Primary Examiner* — Tod T Van Roy
*Assistant Examiner* — Delma R Forde
(74) *Attorney, Agent, or Firm* — Faegre Drinker Biddle & Reath LLP

(57) ABSTRACT

A quantum cascade laser device includes a QCL element; a lens; and a lens holder having a small-diameter hole, a large-diameter hole, and a counterbore surface. At least a part of a side surface of the lens is fixed to an inner surface of the large-diameter hole in a state where an edge portion of an incident surface of the lens is in contact with the counterbore surface. A central axis of the small-diameter hole is eccentric from that of the large-diameter hole. The side surface of the lens is positioned with respect to the inner surface of the large-diameter hole along a direction from the central axis of the large-diameter hole toward the central axis of the small-diameter hole. A central axis of the lens is (Continued)

disposed at a position closer to the central axis of the small-diameter hole than to the central axis of the large-diameter hole.

9 Claims, 20 Drawing Sheets

(51) Int. Cl.
  *H01S 5/024* (2006.01)
  *H01S 5/34* (2006.01)
(58) Field of Classification Search
  CPC .. H01S 5/024; H01S 5/02415; H01S 5/02438; H01S 5/02476–02492; H01S 5/3401; G02B 7/02; G02B 7/021; G02B 7/022; G02B 7/025
  See application file for complete search history.

(56) References Cited

U.S. PATENT DOCUMENTS

| | | |
|---|---|---|
| 2008/0304524 A1 | 12/2008 | Marsland, Jr. et al. |
| 2014/0003062 A1* | 1/2014 | Yoshimura ............ H04N 1/0282 362/311.12 |
| 2015/0109680 A1 | 4/2015 | Vorndran et al. |
| 2018/0254610 A1* | 9/2018 | Ochiai .................... H01S 5/024 |
| 2020/0366055 A1* | 11/2020 | Moon ................. H01S 5/02469 |
| 2023/0163558 A1* | 5/2023 | Ochiai ................. H01S 5/0064 372/44.01 |

FOREIGN PATENT DOCUMENTS

| | | |
|---|---|---|
| JP | H08-195528 A | 7/1996 |
| JP | H09-211268 A | 8/1997 |
| JP | H10-246801 A | 9/1998 |
| JP | 2002-116363 A | 4/2002 |
| JP | 2002-228888 A | 8/2002 |
| JP | 2003-156710 A | 5/2003 |
| JP | 2003-315633 A | 11/2003 |
| JP | 2003-344722 A | 12/2003 |
| JP | 2014-006476 A | 1/2014 |
| JP | 2016-111237 A | 6/2016 |
| JP | 2019-133135 A | 8/2019 |

\* cited by examiner

Fig.9
(A) 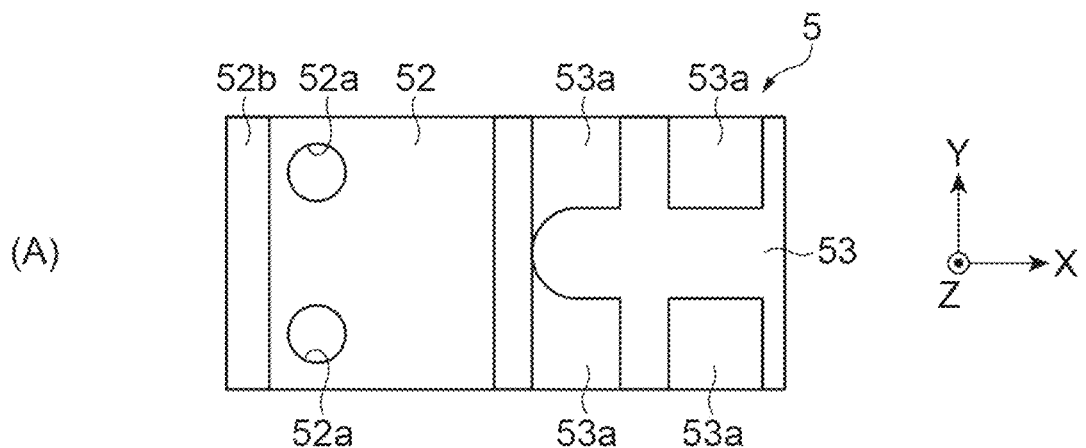
(B) 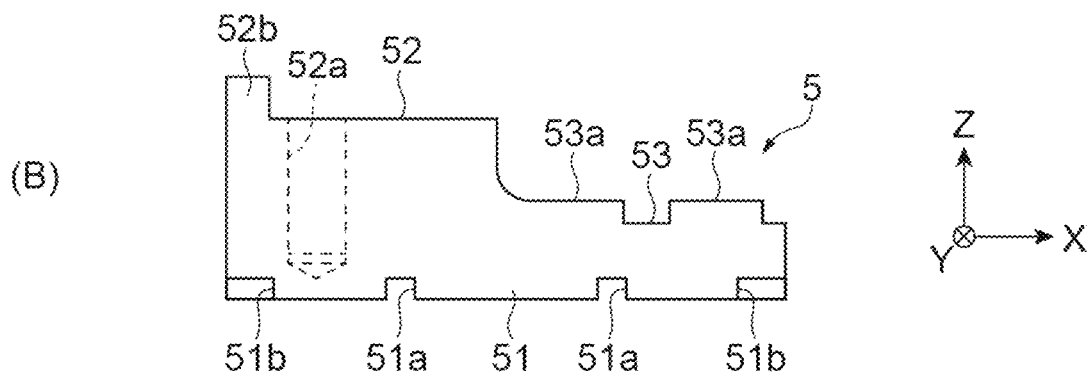
(C) 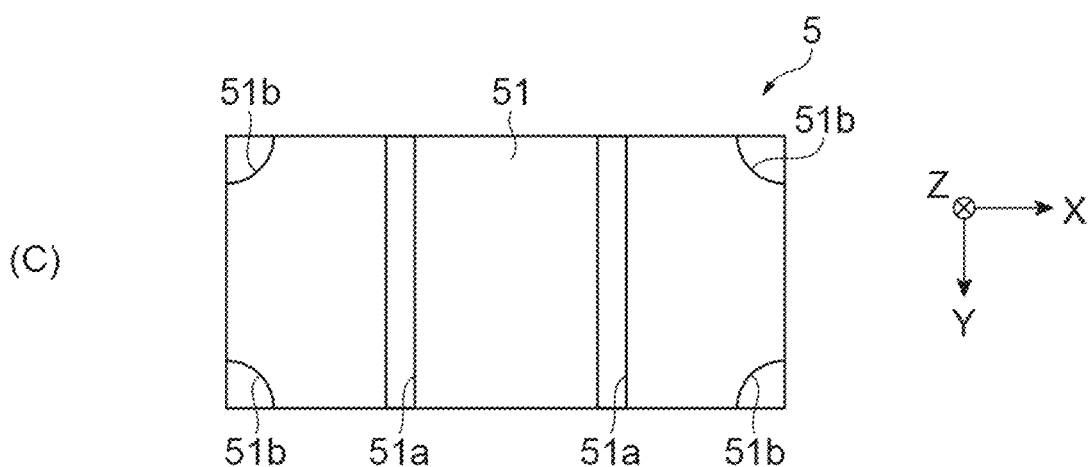

QUANTUM CASCADE LASER DEVICE

TECHNICAL FIELD

The present disclosure relates to a quantum cascade laser device.

BACKGROUND ART

In the related art, a semiconductor laser device (semiconductor laser module) that accommodates a semiconductor laser element in a package has been known (for example, Patent Document 1). Patent Document 1 discloses a configuration in which a package accommodates a semiconductor laser element and a lens holder that accommodates a lens for collimating laser light emitted from the semiconductor laser element.

CITATION LIST

Patent Document

Patent Document 1: Japanese Unexamined Patent Publication No. 2003-315633

SUMMARY OF INVENTION

Technical Problem

Here, the beam radiation angle of laser light emitted from a quantum cascade laser element that is one type of semiconductor laser element is relatively large. In addition, in order to reduce the size of the package, reducing the size of the lens accommodated in the package is required. For this reason, when the quantum cascade laser element is used as the semiconductor laser element, in order to concentrate the laser light from the quantum cascade laser element having a large radiation angle using a small lens, using an effective region of the lens without waste is required.

Therefore, an object of the present disclosure is to provide a quantum cascade laser device in which an effective region of a lens can be efficiently used.

Solution to Problem

A quantum cascade laser device according to one aspect of the present disclosure includes: a quantum cascade laser element; a lens disposed to face an emitting surface of the quantum cascade laser element that emits laser light; and a lens holder that holds the lens. The lens holder includes a first hole portion extending in an optical axis direction along an optical axis of the laser light, a second hole portion that is provided at a position farther from the quantum cascade laser element than the first hole portion, and that includes the first hole portion and is larger than the first hole portion when viewed in the optical axis direction, and a counterbore surface having an annular shape that connects the first hole portion and the second hole portion and that extends along a plane intersecting the optical axis direction. The lens includes an incident surface on which the laser light is incident, and a side surface extending from an edge portion of the incident surface along the optical axis direction. At least a part of the side surface is fixed to an inner surface of the second hole portion through a resin adhesive agent in a state where the edge portion of the incident surface is in contact with the counterbore surface. A central axis of the first hole portion is eccentric from a central axis of the second hole portion. The side surface of the lens is positioned with respect to the inner surface of the second hole portion along a direction from the central axis of the second hole portion toward the central axis of the first hole portion. A central axis of the lens is disposed at a position closer to the central axis of the first hole portion than to the central axis of the second hole portion.

In the quantum cascade laser device, the lens holder includes the first hole portion and the second hole portion of which the central axes are eccentric with respect to each other. In addition, the side surface of the lens is positioned with respect to the inner surface of the second hole portion along the direction from the central axis of the second hole portion toward the central axis of the first hole portion. Accordingly, the positional offset of the lens (movement of the lens with respect to the lens holder) that may be caused by the surface tension of the resin adhesive agent disposed around the lens in case that the lens is disposed at a central portion of the second hole portion can be suitably suppressed. Further, the central axis of the lens is disposed at a position close to the central axis of the first hole portion in a state where the lens is positioned in such a manner. Accordingly, the area of a region in which an effective region of the lens (region within an effective diameter around the central axis of the lens) and the counterbore surface interfere with (overlap) each other can be reduced. As a result, the effective region of the lens can be efficiently used.

The central axis of the lens may substantially coincide with the central axis of the first hole portion, and an effective diameter of the lens may substantially coincide with a diameter of the first hole portion. According to this configuration, the entirety of the effective region (region within the effective diameter) of the lens can be exposed through the first hole portion. Accordingly, the size of the first hole portion is suppressed to its minimum to secure the area of the counterbore surface, so that it is possible to make the most use of the effective region of the lens while appropriately supporting the edge portion of the incident surface of the lens.

A recess that reaches the counterbore surface along the optical axis direction may be formed in the inner surface of the second hole portion, and the resin adhesive agent may enter the recess. According to this configuration, the resin adhesive agent can be easily injected into a gap between the side surface of the lens and the inner surface of the second hole portion through the recess.

The quantum cascade laser device may further include a heat spreader on which the lens holder is mounted. The lens holder may have a first attachment surface on which a plurality of first protrusions protruding to a heat spreader side are formed, and the plurality of first protrusions may be joined to a second attachment surface of the heat spreader through an adhesive layer made of a photocurable resin. According to this configuration, since locations where the adhesive layer (photocurable resin) is provided can be dispersed onto the plurality of first protrusions, the adhesive layer on each of the first protrusions can be easily and appropriately cured compared to when the adhesive layer is provided in a wide range on the entire surface.

A plurality of second protrusions protruding to a lens holder side may be formed on the second attachment surface at positions corresponding to the plurality of first protrusions, and the plurality of first protrusions may be joined to the plurality of second protrusions through the adhesive layer. According to this configuration, the adhesive layer is disposed at a central portion of a space formed between the first attachment surface and the second attachment surface. Accordingly, the adhesive layer can be suitably irradiated with light reflected by the first attachment surface and by the second attachment surface in the space. As a result, the adhesive layer can be more appropriately cured, and the lens holder can be stably fixed to the heat spreader.

A first wall portion having the first attachment surface of the lens holder may be provided with a through-hole or a cutout for guiding light to the second attachment surface of the heat spreader. According to this configuration, the second attachment surface of the heat spreader can be irradiated with light from a side opposite to a side on which the heat spreader is disposed with respect to the lens holder, through the through-hole or the cutout provided in the first wall portion. Accordingly, light irradiation for curing the adhesive layer between the first attachment surface and the second attachment surface can be easily performed.

The lens holder may include a second wall portion facing the first wall portion through the second hole portion, and the second wall portion may be formed not to overlap at least a part of the through-hole or the cutout provided in the first wall portion, when viewed in a direction in which the first wall portion and the second wall portion face each other. According to this configuration, the lens disposed in the second hole portion can be appropriately protected from the outside by the first wall portion and the second wall portion. In addition, since the second wall portion is formed not to overlap at least a part of the through-hole or the cutout provided in the first wall portion, the second attachment surface of the heat spreader can be irradiated with light by irradiating the lens holder with the light from the outside of the lens holder (side opposite to the first wall portion with the second wall portion sandwiched therebetween).

The quantum cascade laser element and the lens holder may be mounted on the same heat spreader. According to this configuration, since a base (heat spreader) on which the quantum cascade laser element and the lens holder are placed is shared, when the heat spreader expands or contracts because of heat, a relative movement of the lens holder with respect to the quantum cascade laser element can be suppressed. As a result, the occurrence of an optical axis offset (offset of the central axis of the lens with respect to the optical axis of the laser light emitted from the quantum cascade laser element) caused by a temperature change in the package can be suppressed.

The quantum cascade laser device may further include a package that airtightly accommodates the quantum cascade laser element, the lens, and the lens holder. The package may include a bottom wall, a side wall standing on the bottom wall and being formed in an annular shape to surround a region in which the quantum cascade laser element and the lens holder are accommodated, when viewed in a direction perpendicular to the bottom wall, and a top wall that closes an opening on an opposite side of the side wall from a bottom wall side. A light-emitting window through which the laser light that has passed through the lens passes may be provided on the side wall. According to this configuration, as described above, since the effective region of the lens disposed in the package can be efficiently used, the size of the lens can be reduced, and the size of the package can be reduced.

Advantageous Effects of Invention

According to the present disclosure, it is possible to provide the quantum cascade laser device in which the effective region of the lens can be efficiently used.

Figure 7:
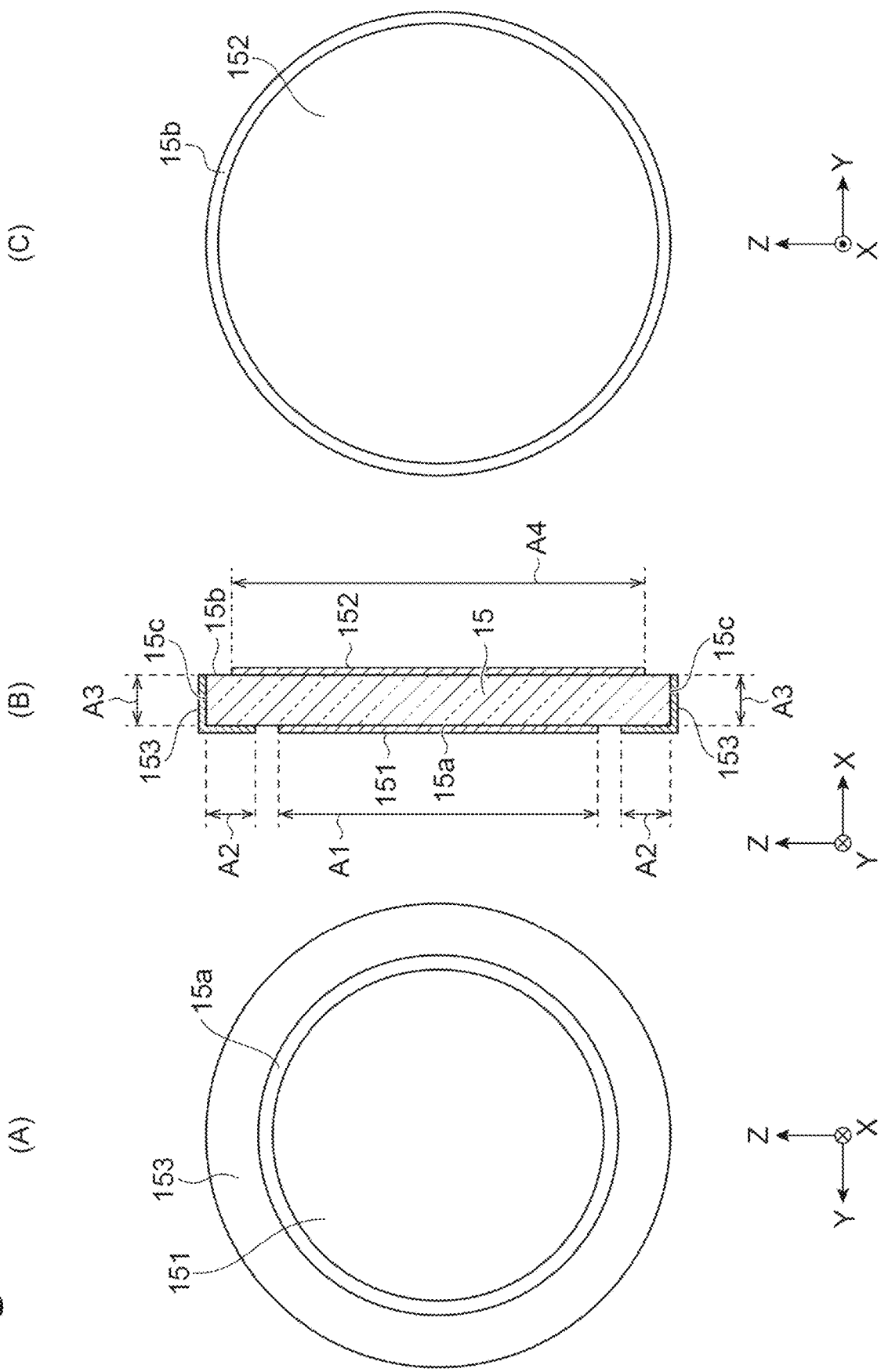

(A) of FIG. 7 is a view showing an incident surface of a window member, (B) of FIG. 7 is a cross-sectional view of the window member, and (C) of FIG. 7 is a view showing an emitting surface of the window member.

Figure 8:
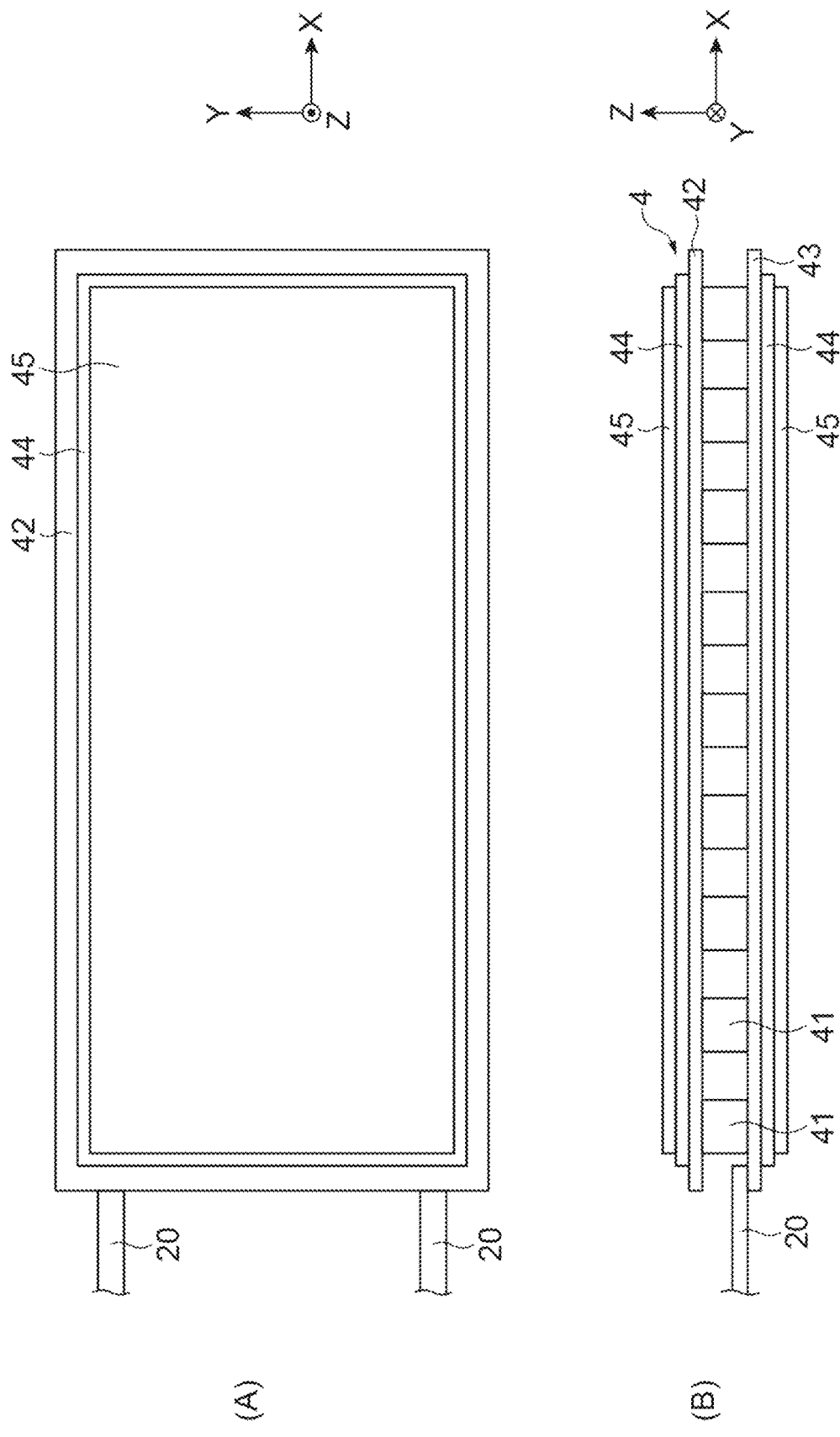

(A) of FIG. 8 is a top view of a Peltier module, and (B) of FIG. 8 is a side view of the Peltier module.

(A) of FIG. 9 is a top view of a heat spreader, (B) of FIG. 9 is a side view of the heat spreader, and (C) of FIG. 9 is a bottom view of the heat spreader.

Figure 10:
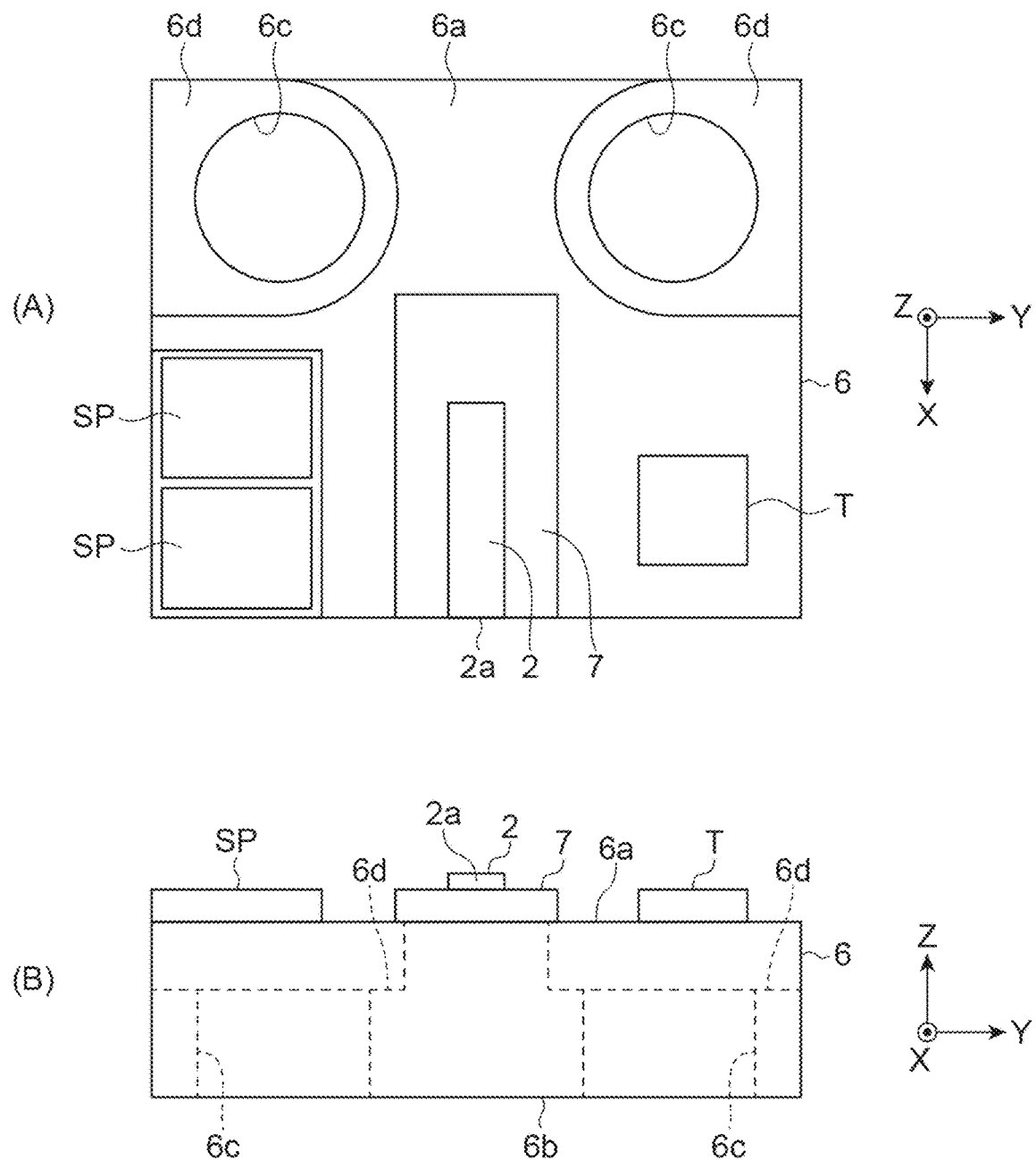

(A) of FIG. 10 is a top view of a heat sink on which each element is mounted, and (B) of FIG. 10 is a side view of the heat sink on which each element is mounted.

Figure 11:
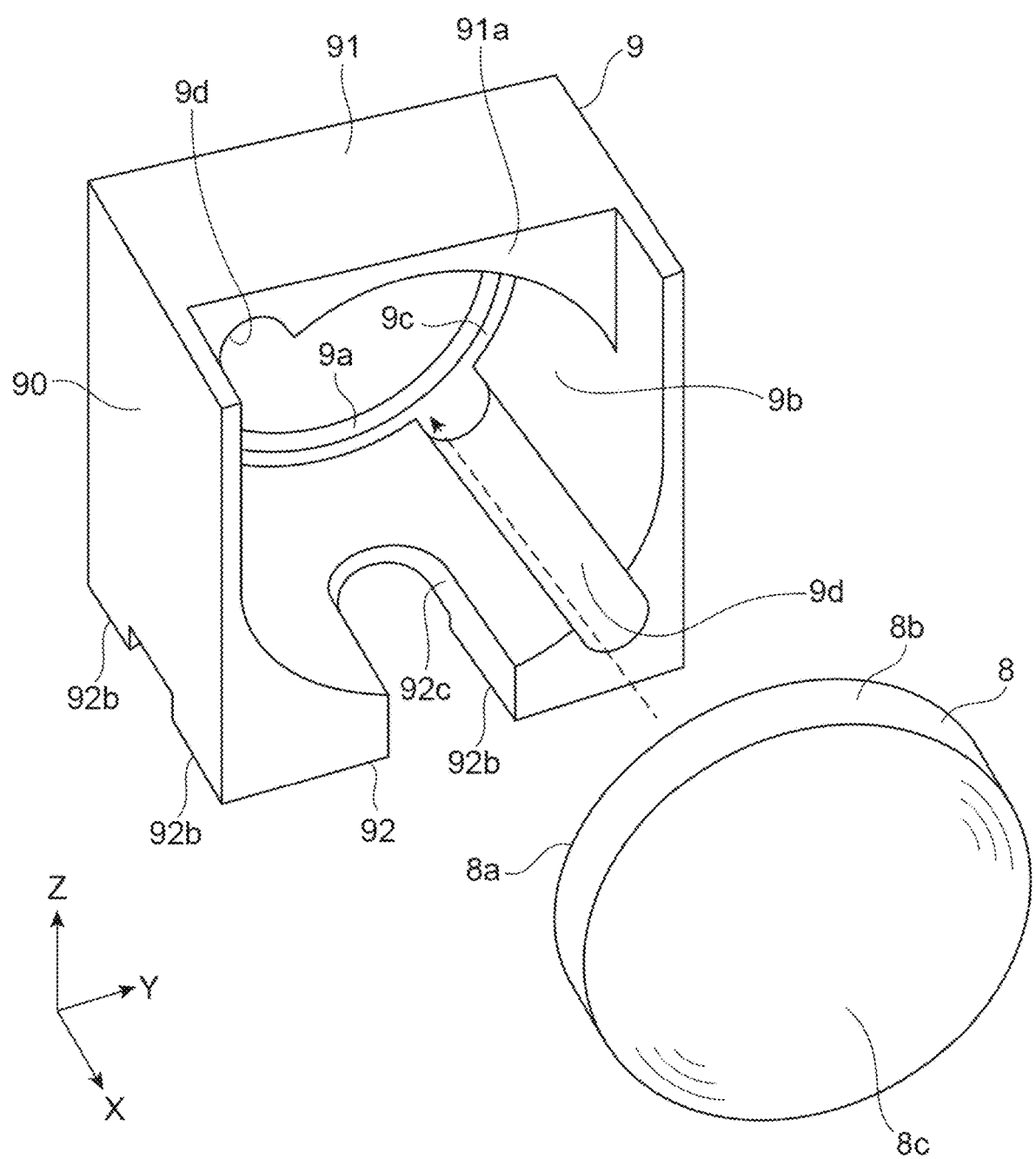

FIG. 11 is a perspective view of a lens holder.

Figure 12:
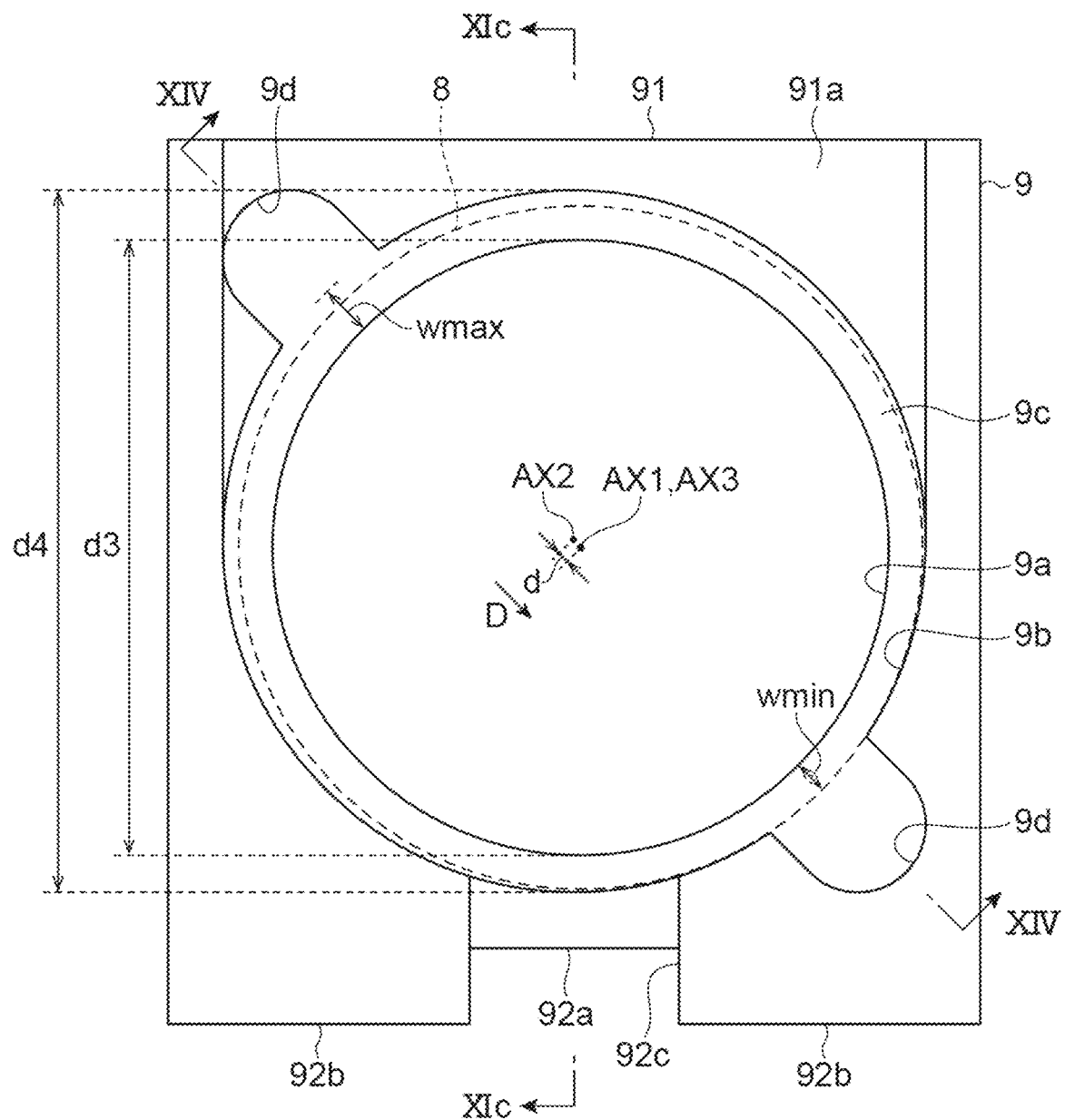

FIG. 12 is a front view of the lens holder.

Figure 13:
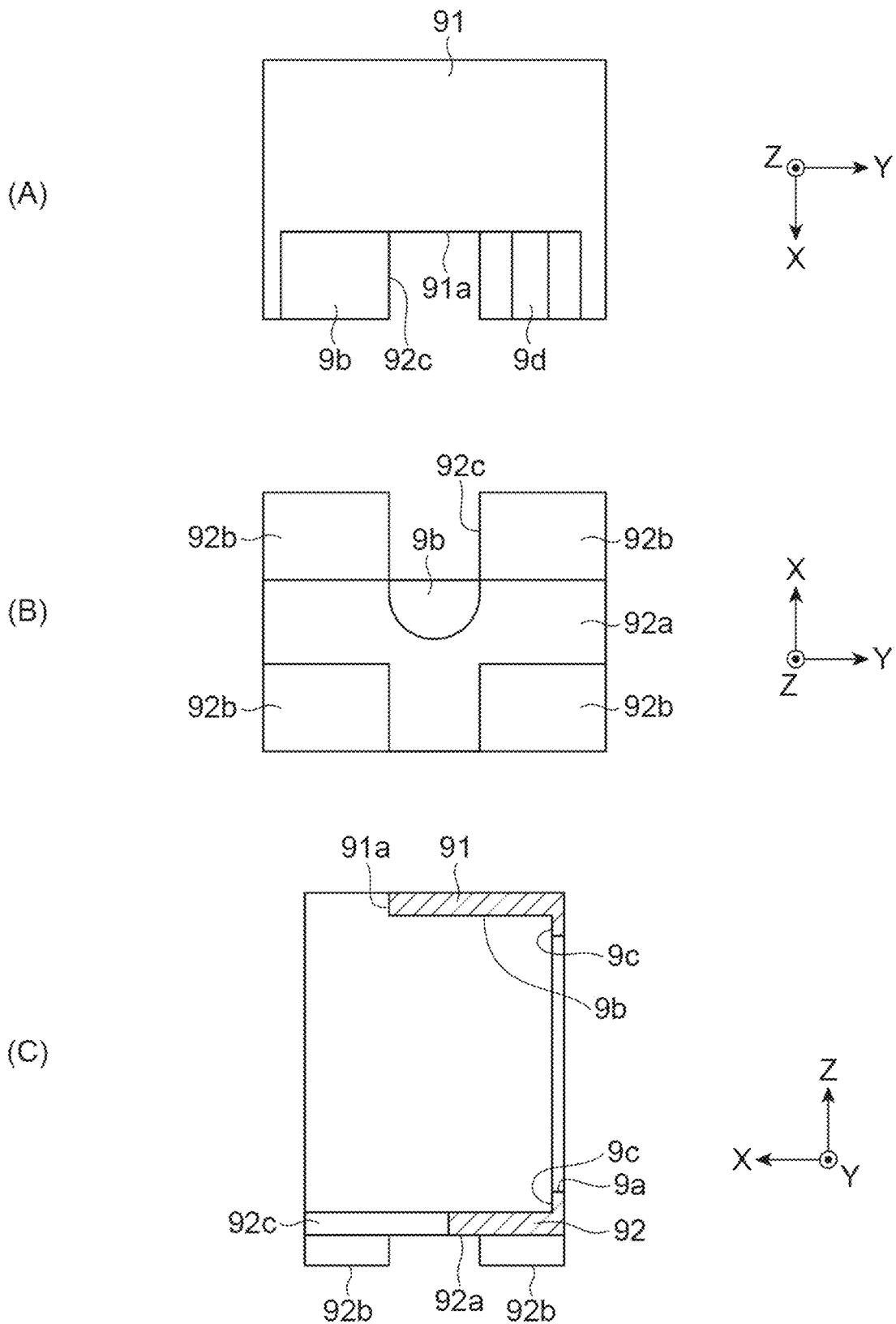

(A) of FIG. 13 is a top view of the lens holder, (B) of FIG. 13 is a bottom view of the lens holder, and (C) of FIG. 13 is a side cross-sectional view of the lens holder.

Figure 14:
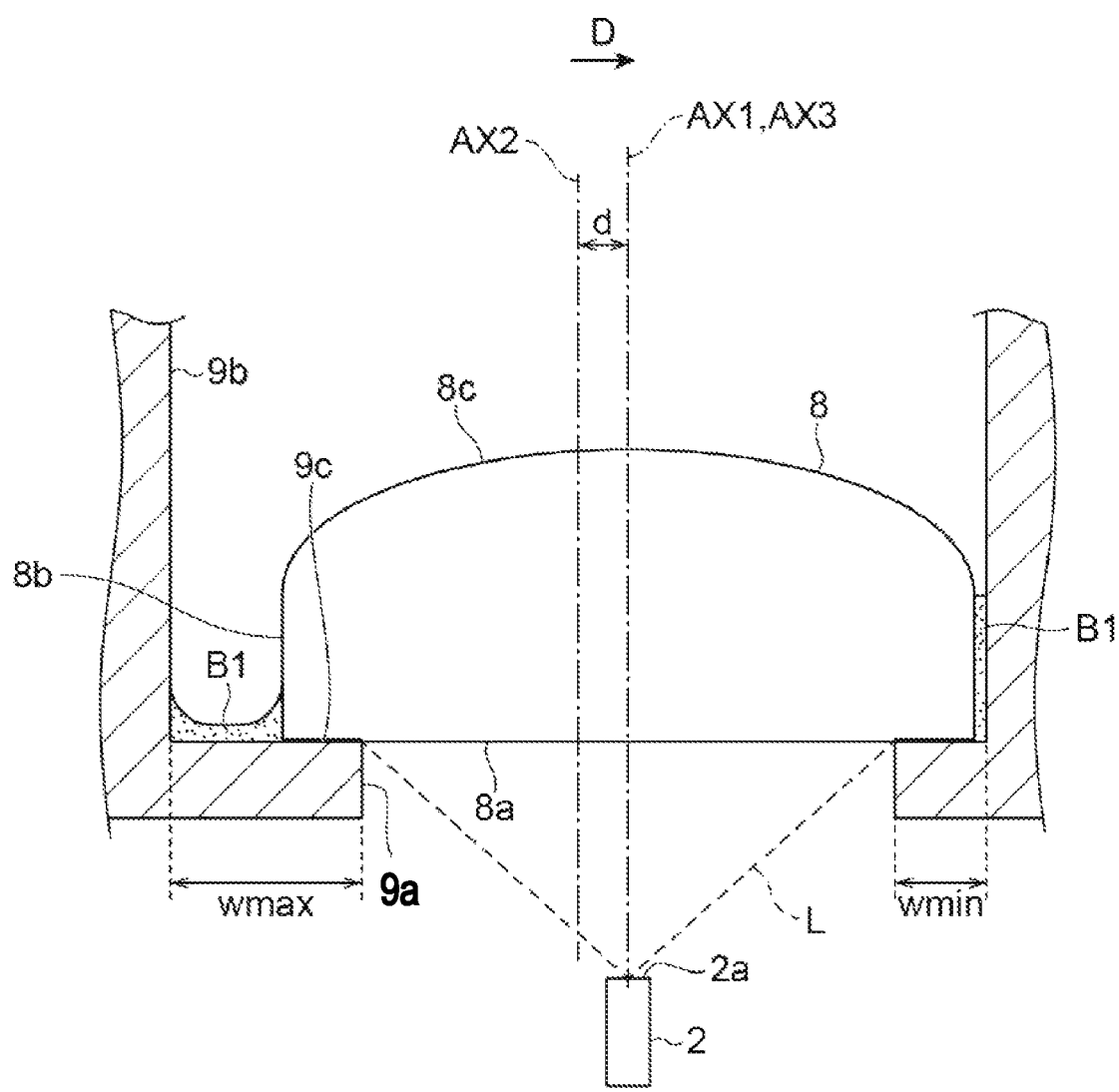

FIG. 14 is a view schematically showing a cross section taken along line XIV-XIV in FIG. 12.

Figure 15:
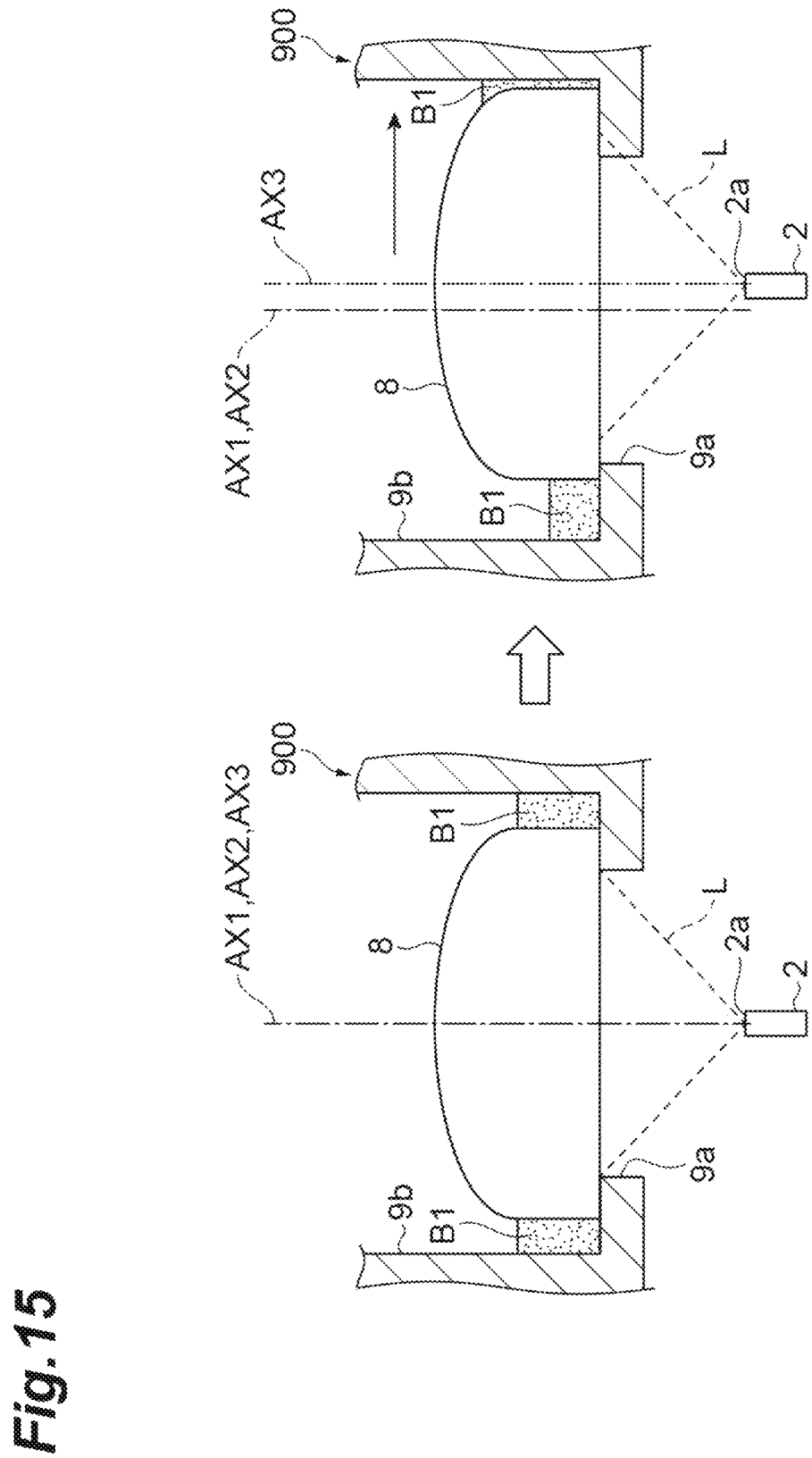

FIG. 15 is a view schematically showing a positional relationship between a lens and a lens holder when the lens holder according to a comparative example is used.

Figure 1:
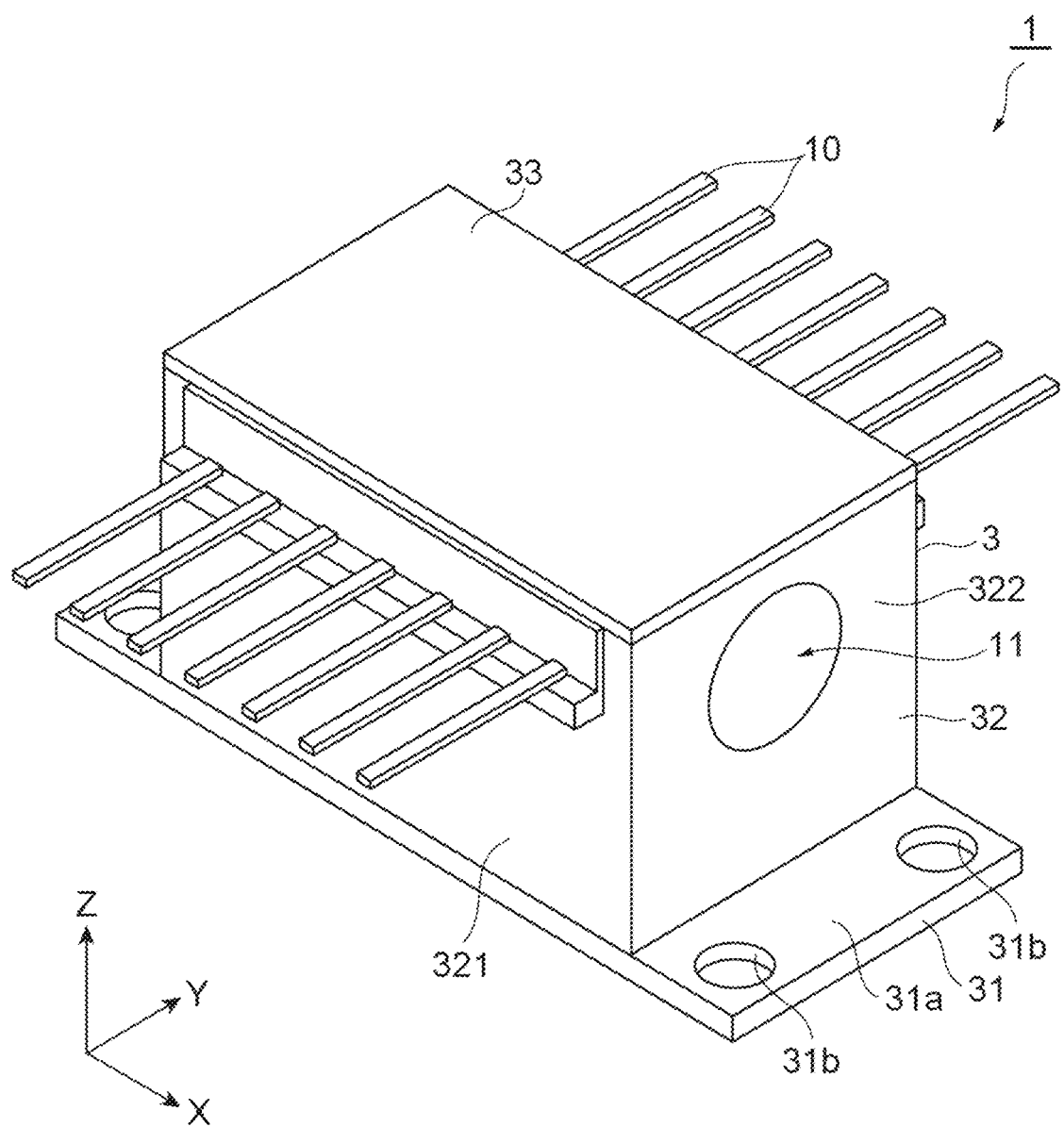
FIG. 1 is a perspective view of a quantum cascade laser device of one embodiment.
Figure 16:
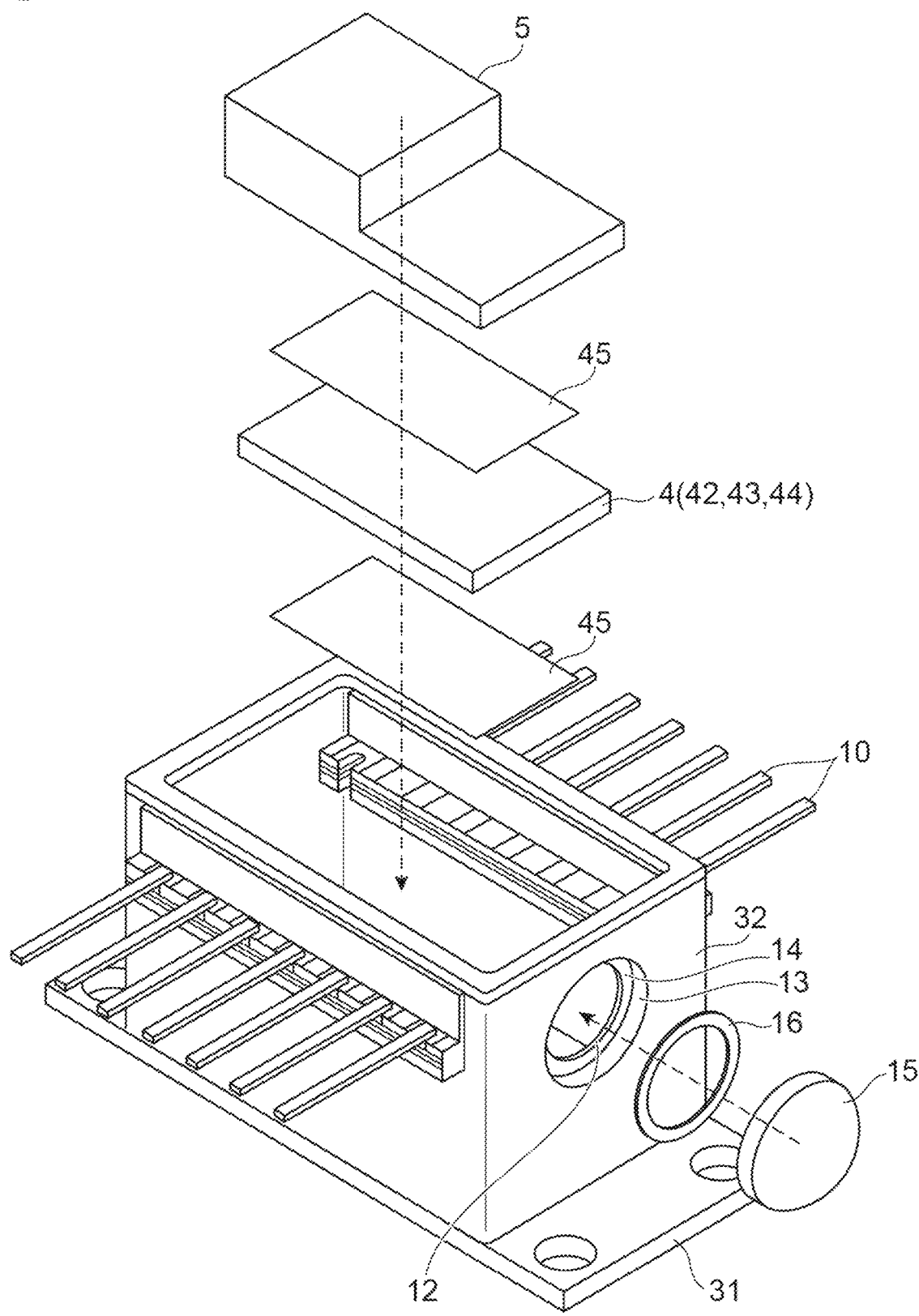

FIG. 16 is a view showing a part of an assembly procedure of the quantum cascade laser device shown in FIG. 1.

Figure 17:
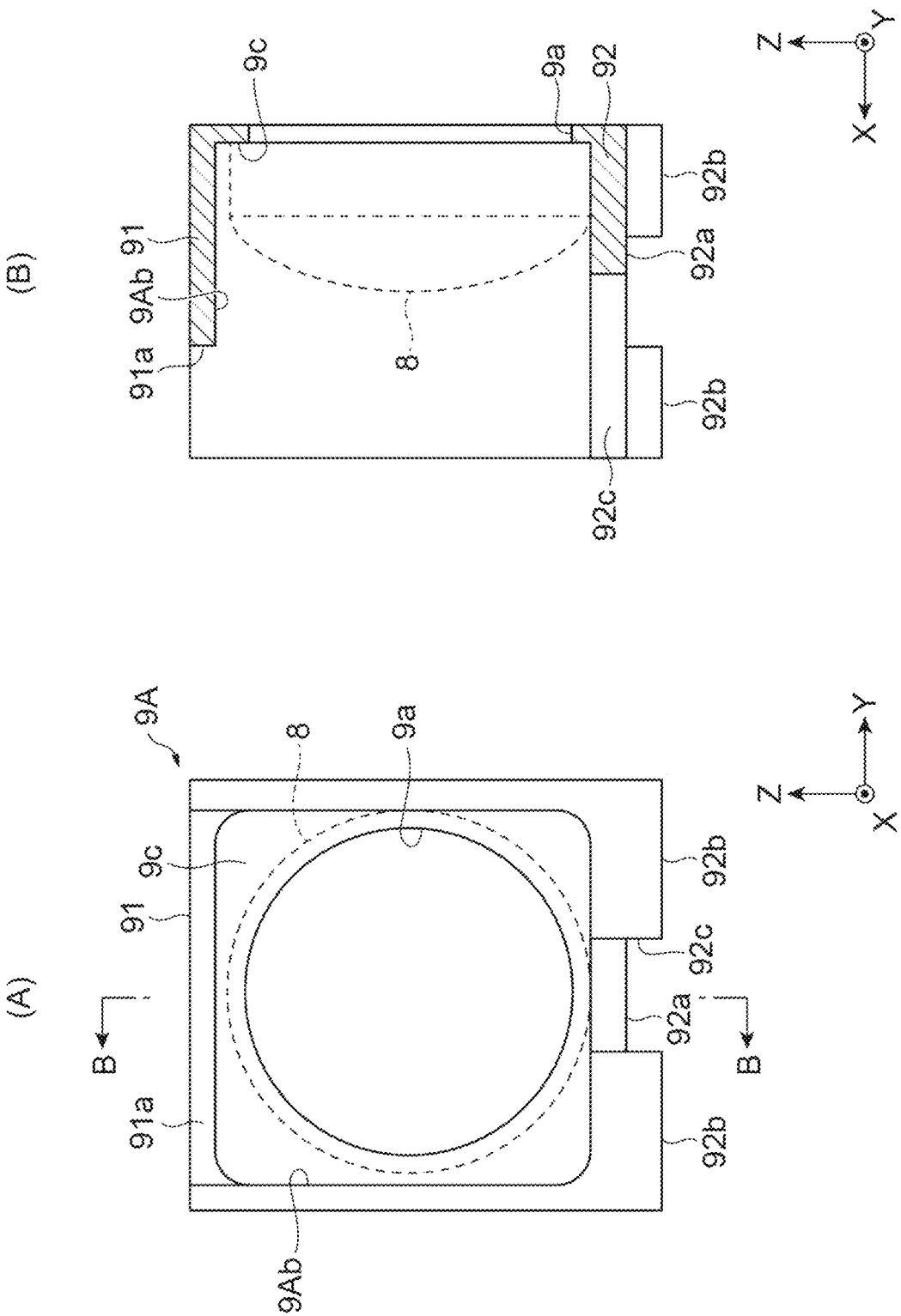

(A) of FIG. 17 is a front view of a lens holder of a first modification example, and (B) of FIG. 17 is a cross-sectional view of the lens holder taken along line B-B of (A) of FIG. 17.

Figure 18:
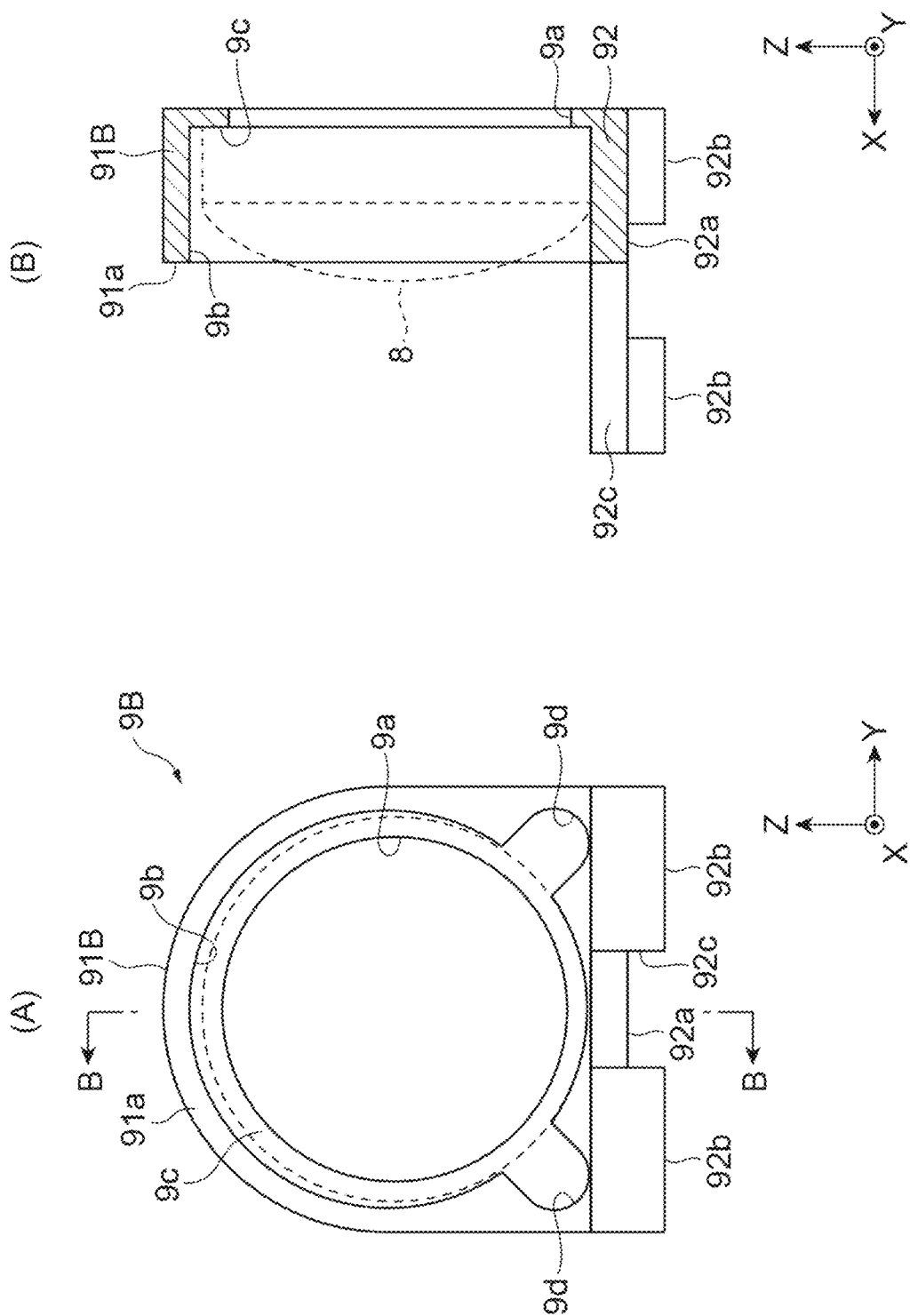

(A) of FIG. 18 is a front view of a lens holder of a second modification example, and (B) of FIG. 18 is a cross-sectional view of the lens holder taken along line B-B of (A) of FIG. 18.

Figure 19:
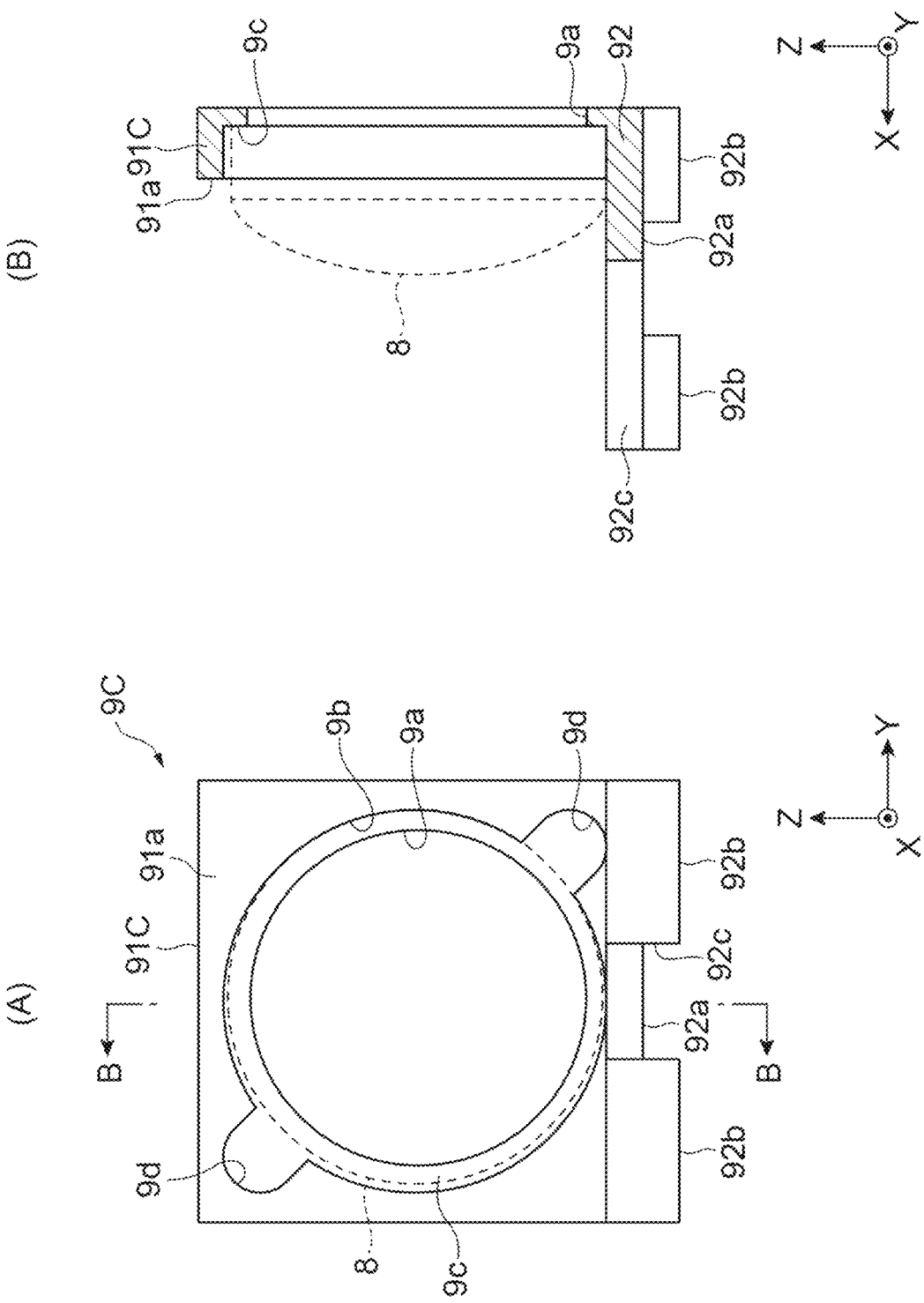

(A) of FIG. 19 is a front view of a lens holder of a third modification example, and (B) of FIG. 19 is a cross-sectional view of the lens holder taken along line B-B of (A) of FIG. 19.

Figure 20:
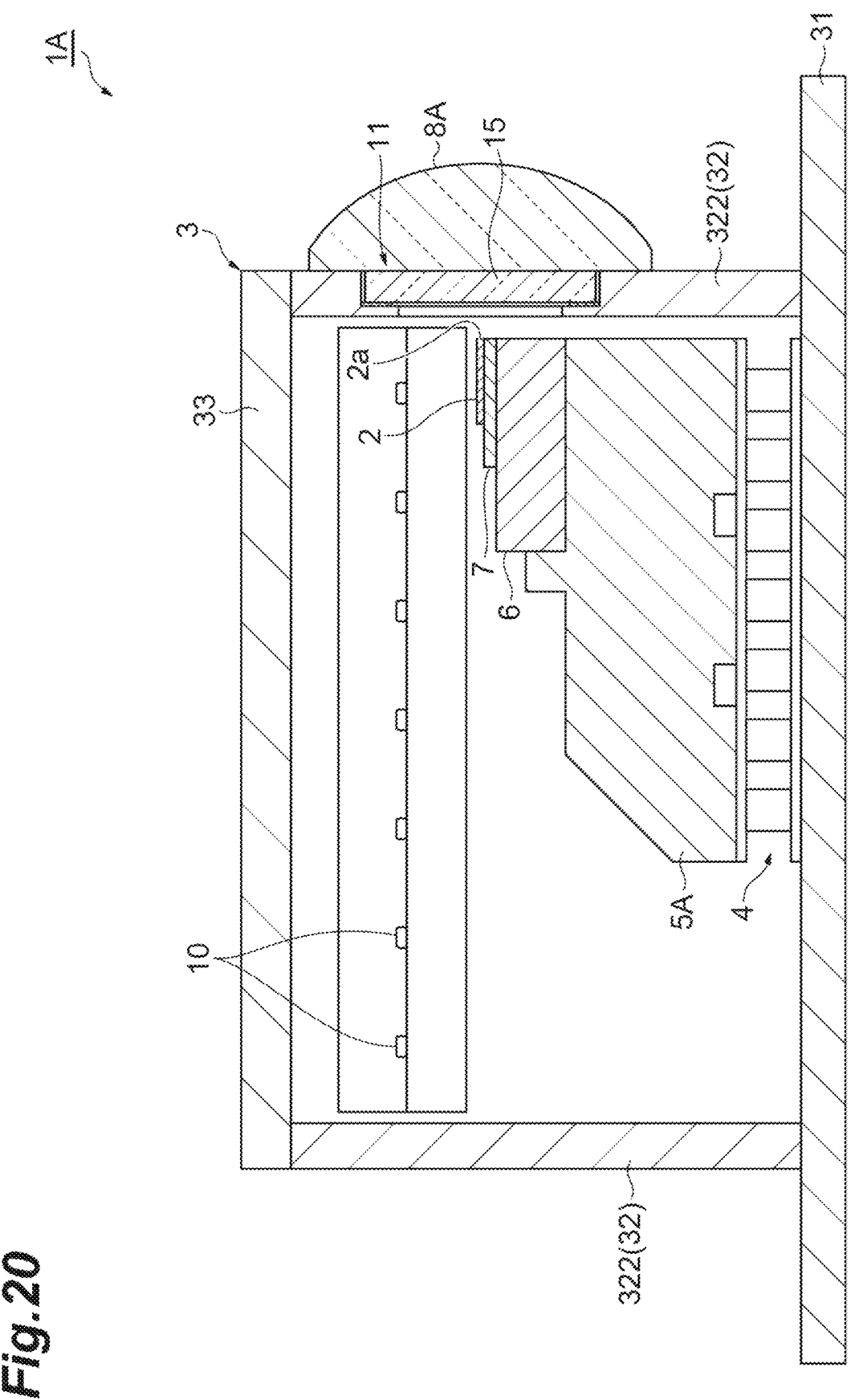

FIG. 20 is a side cross-sectional view of a quantum cascade laser device of a modification example.

DESCRIPTION OF EMBODIMENTS

Hereinafter, an embodiment of the present disclosure will be described with reference to the drawings. In the drawings, the same or equivalent portions are denoted by the same reference signs, and a duplicated description will not be repeated. Incidentally, in the drawings, some portions may be exaggerated for an easy-to-understand description of configurations according to the embodiment, and have dimensions different from actual dimensions. In addition, in the following description, the terms "up", "down", and the like are for convenience based on states shown in the drawings.

Figure 2:
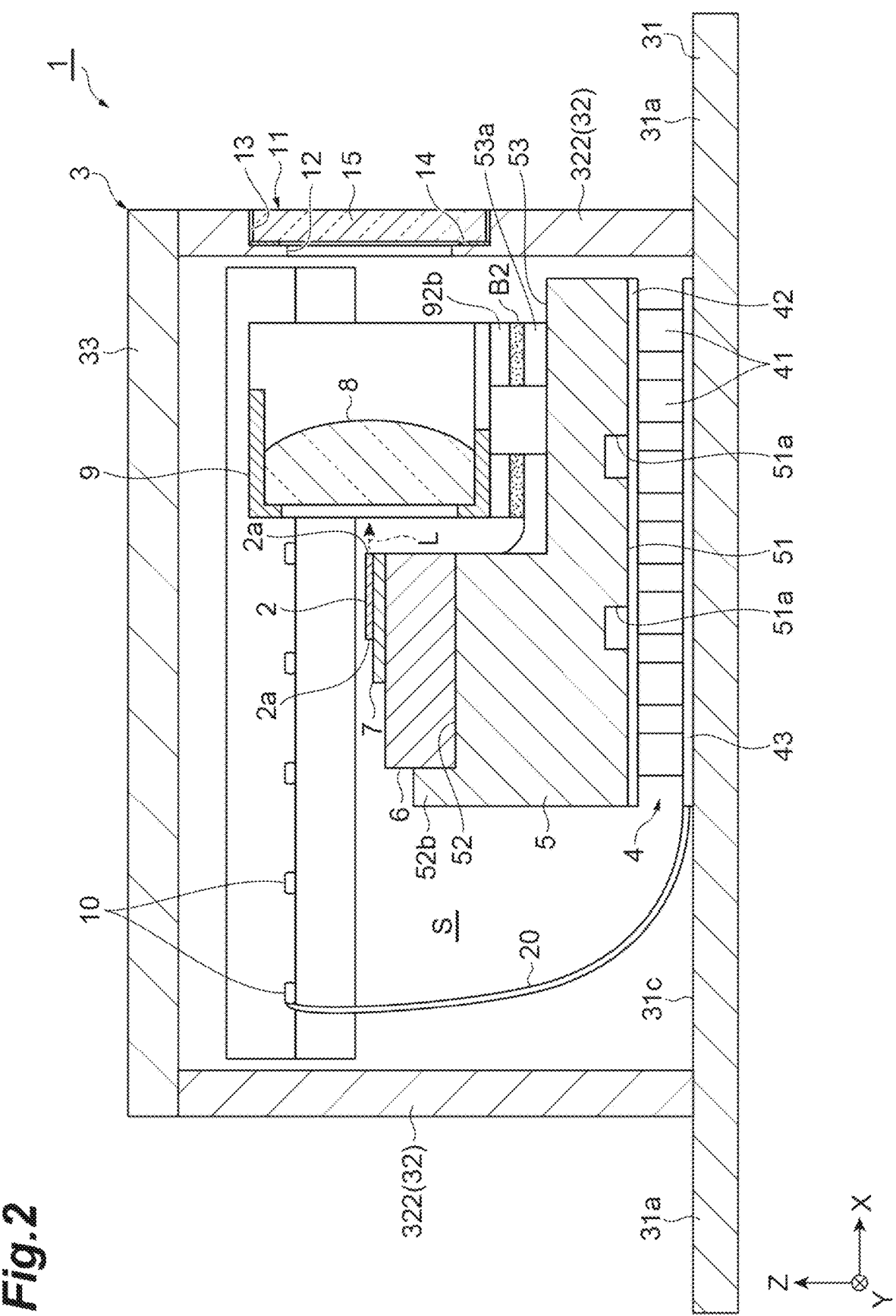
FIG. 2 is a side cross-sectional view of the quantum cascade laser device shown in FIG. 1.
Figure 3:
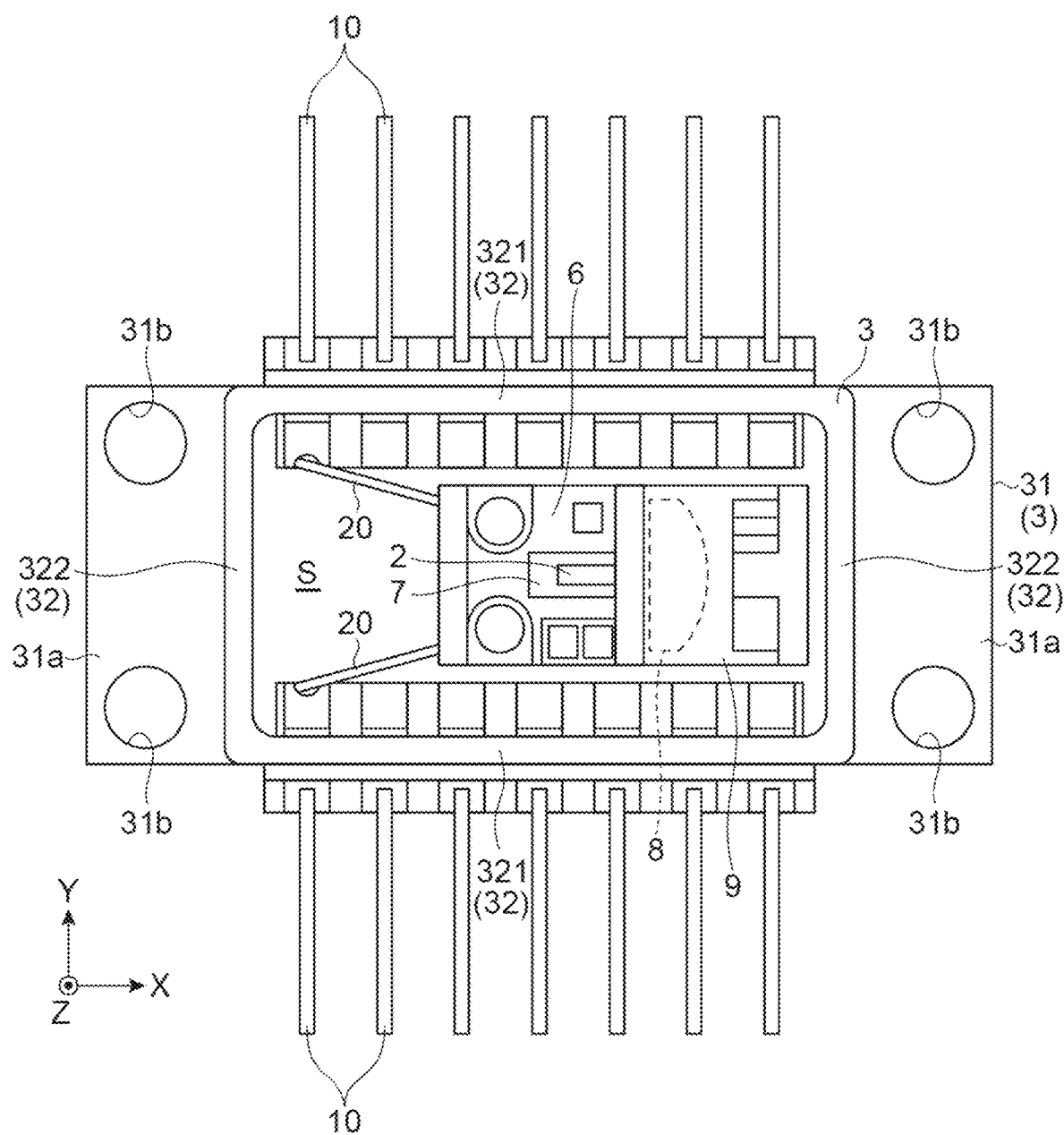
FIG. 3 is a plan view of the quantum cascade laser device shown in FIG. 1.

As shown in FIGS. 1 to 3, a quantum cascade laser device 1 (semiconductor laser device) includes a quantum cascade laser element (hereinafter, "QCL element") 2 and a package 3 that airtightly accommodates the QCL element 2.

Figure 4:
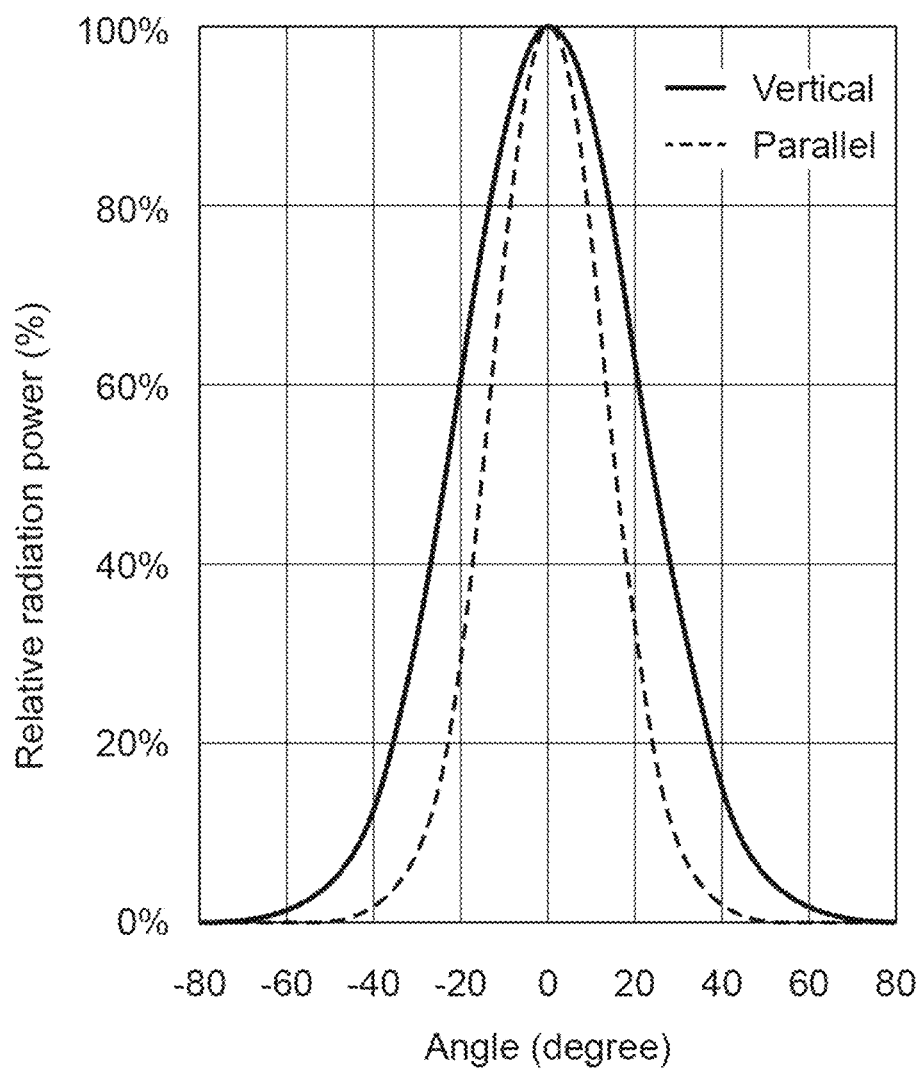
FIG. 4 is a graph showing a typical example of a relationship between the radiation angle (horizontal axis) and the radiation intensity (vertical axis) of laser light emitted by a quantum cascade laser.

The QCL element 2 is one type of semiconductor laser element. The QCL element 2 has an end surface 2a (emitting surface) intersecting one direction (in the present embodiment, an X-axis direction), and is configured to emit laser light L having a broadband wavelength (for example, 4 μm to 12 μm) in a mid-infrared region from the end surface 2a. In the present embodiment, an optical axis of the laser light L emitted from the QCL element 2 is disposed along the X-axis direction. The QCL element 2 has, for example, a structure in which a plurality of active layers having different center wavelengths are stacked in a stack, and can emit the above-described broadband light. However, the QCL element 2 may have a structure including a single active layer, and in this case as well, can emit the above-described broadband light. As shown in FIG. 4, the laser light L emitted from the QCL element 2 has a very large beam radiation angle (divergence angle) as per the principle of a quantum cascade laser compared to a laser diode or the like.

The package 3 is a so-called butterfly package. The package 3 includes a bottom wall 31, a side wall 32, and a top wall 33. In FIG. 3, the top wall 33 of the package 3 is not shown.

The bottom wall 31 is a rectangular plate-shaped member. The bottom wall 31 is made of, for example, a metal material such as copper-tungsten. The bottom wall 31 is a base member on which various members such as a Peltier module 4 to be described later are to be mounted. In this specification, for convenience, a longitudinal direction of the bottom wall 31 is referred to as the X-axis direction, a lateral direction of the bottom wall 31 is referred to as a Y-axis direction, and a direction perpendicular to the bottom wall 31 (namely, a direction orthogonal to the X-axis direction and to the Y-axis direction) is referred to as a Z-axis direction. As described above, the X-axis direction is also a direction along the optical axis of the laser light L emitted from the QCL element 2 (optical axis direction).

The side wall 32 stands on the bottom wall 31. When viewed in the Z-axis direction, the side wall 32 is formed in an annular shape to surround a region (internal space S) in which the QCL element 2 and the like are accommodated. In the present embodiment, the side wall 32 is a rectangular tubular member that surrounds the internal space S. The side wall 32 is made of a metal material such as Kovar. The side wall 32 is, for example, a Kovar frame to which Ni/Au plating is applied. In the present embodiment, the side wall 32 is provided on a central portion of the bottom wall 31 in the longitudinal direction (X-axis direction). A width of the side wall 32 in the lateral direction (Y-axis direction) is equal to a width of the bottom wall 31 in the lateral direction, and a width of the side wall 32 in the longitudinal direction (X-axis direction) is shorter than a width of the bottom wall 31 in the longitudinal direction. Namely, protrusion portions 31a protruding and extending outward from the side wall 32 are formed on both respective sides of the bottom wall 31 in the longitudinal direction. Screw holes 31b for attaching the package 3 (bottom wall 31) to another member are provided in respective portions of the protrusion portions 31a corresponding to four corners of the bottom wall 31.

The top wall 33 is a member that closes an opening on an opposite side of the side wall 32 from a bottom wall 31 side. The top wall 33 has a rectangular plate shape. An outer shape (widths in the longitudinal direction and in the lateral direction) of the top wall 33 viewed in the Z-axis direction substantially coincides with an outer shape of the side wall 32. The top wall 33 is made of, for example, the same metal material (for example, Kovar or the like) as that of the side wall 32.

A plurality (in the present embodiment, seven on each of both sides in the lateral direction, for a total of 14) of lead pins 10 for allowing a current to flow to members such as the QCL element 2 accommodated in the package 3 are inserted into portions 321 of the side wall 32 extending along the longitudinal direction (X-axis direction) (namely, portions intersecting the lateral direction (Y-axis direction)).

A light-emitting window 11 through which the laser light L emitted from one end surface 2a of the QCL element 2 passes is provided on one of portions 322 of the side wall 32 extending along the lateral direction (Y-axis direction) (namely, portions intersecting the longitudinal direction (X-axis direction)).

Figure 5:
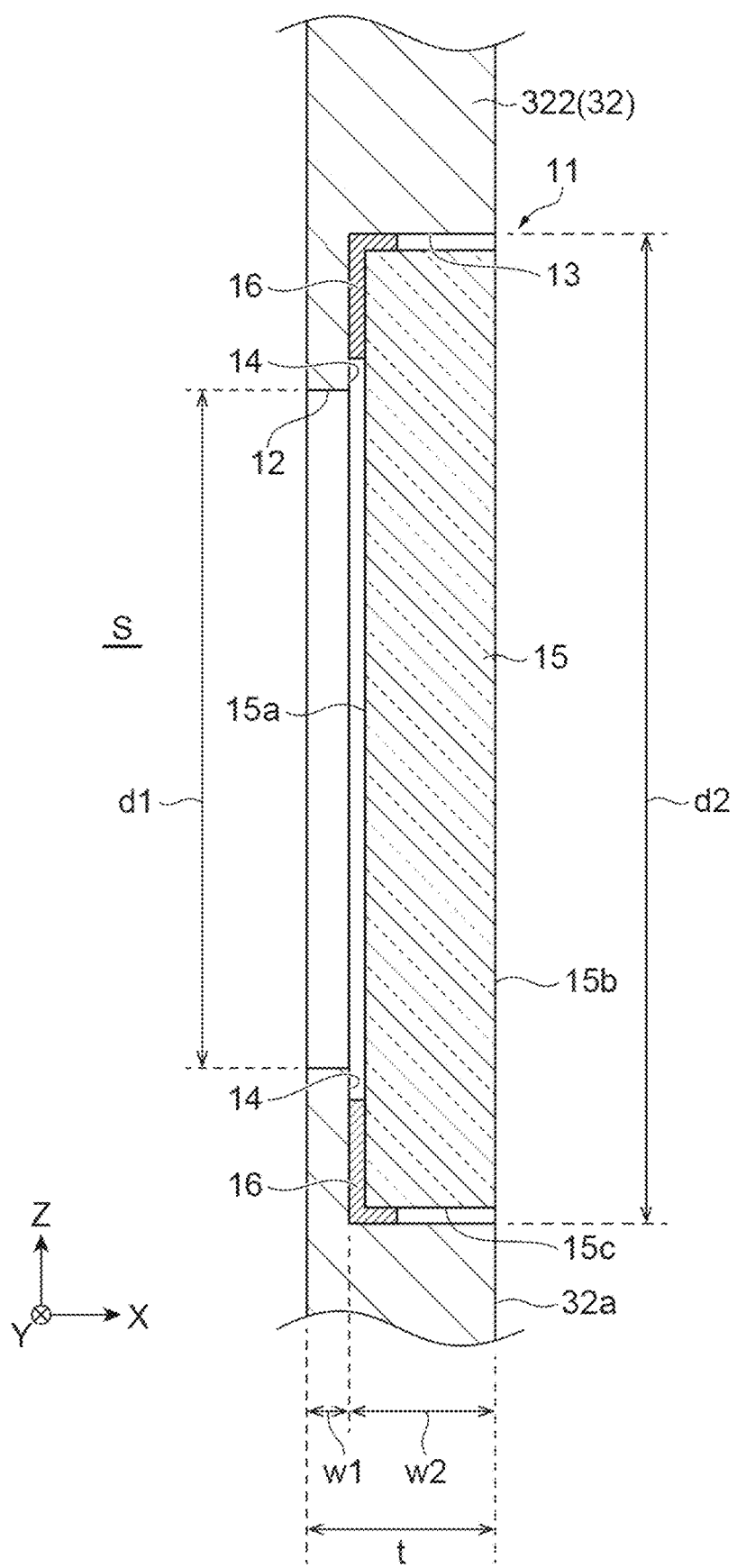
FIG. 5 is a partial enlarged view of the quantum cascade laser device shown in FIG. 1.
Figure 6:
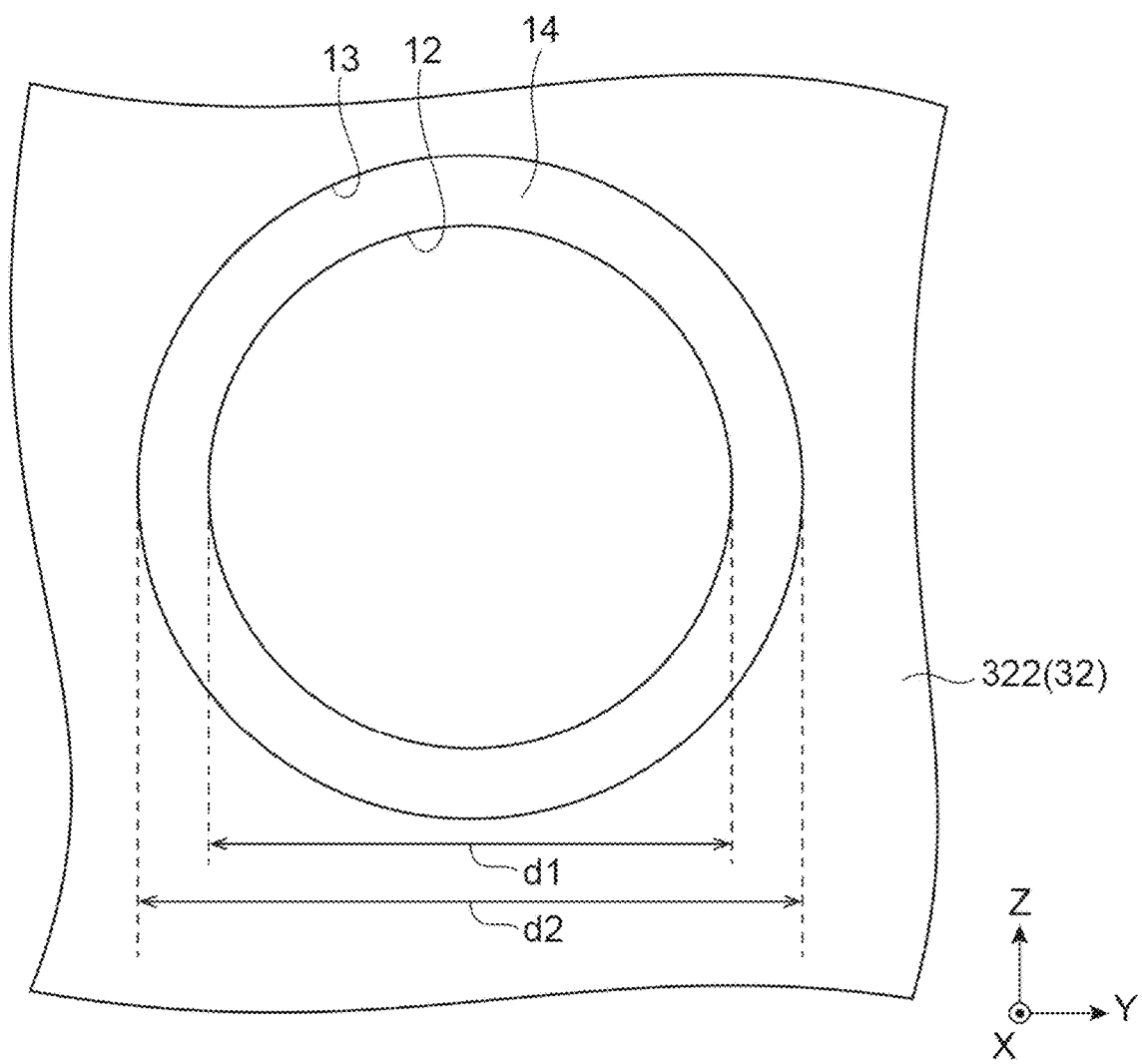
FIG. 6 is a front view of a portion of a side wall including a small-diameter hole and a large-diameter hole.

As shown in FIGS. 5 and 6, the light-emitting window 11 includes a small-diameter hole 12, a large-diameter hole 13, a counterbore surface 14, which are formed by the side wall 32 (portion 322), and a window member 15. Incidentally, anti-reflection films 151 and 152 and a metal film 153 to be described later are provided on the window member 15 (refer to FIG. 7). Since these members are very thin compared to a main body of the window member 15, these members are not shown in the drawings other than FIG. 7.

The small-diameter hole 12 opens to the inside (namely, the internal space S) of the package 3 in the optical axis direction along the optical axis of the laser light L (namely, the X-axis direction). The large-diameter hole 13 opens to the outside of the package 3. The large-diameter hole 13 is shaped to include the small-diameter hole 12 and to be larger than the small-diameter hole 12 when viewed in the X-axis direction. Each of the small-diameter hole 12 and the large-diameter hole 13 extends in the X-axis direction. The small-diameter hole 12 and the large-diameter hole 13 connected to each other by the counterbore surface 14 forms a through-hole penetrating through the side wall 32 in the X-axis direction. In the present embodiment, each of the small-diameter hole 12 and the large-diameter hole 13 is formed in a circular shape, and a diameter d2 of the large-diameter hole 13 is larger than a diameter d1 of the small-diameter hole 12 (d2>d1). In addition, a central axis of the small-diameter hole 12 and a central axis of the large-diameter hole 13 may coincide with the optical axis of the laser light L emitted from the QCL element 2. The counterbore surface 14 is an annular surface that connects the small-diameter hole 12 and the large-diameter hole 13, and that extends along a plane intersecting the X-axis direction (Y-Z plane). More specifically, the counterbore surface 14 connects an end portion on a large-diameter hole 13 side of the small-diameter hole 12 and an end portion on a small-diameter hole 12 side of the large-diameter hole 13. The large-diameter hole 13 and the counterbore surface 14 can be formed by performing counterbore processing from the outside of the package 3. Incidentally, in the present embodiment, the counterbore surface 14 is formed in a continuous annular shape, but the counterbore surface 14 may be formed in a discontinuous annular shape. For example, a cutout may be formed at a part of an inner wall surface of the small-diameter hole 12 to divide the counterbore surface 14 at the portion at which the cutout is formed.

In the present embodiment, the diameter d1 of the small-diameter hole 12 is 3.8 mm, the diameter d2 of the large-diameter hole 13 is 5.7 mm, and a width of the counterbore surface 14 in a radial direction ((d2−d1)/2) is 0.95 mm. In addition, a length w1 of the small-diameter hole 12 along the X-axis direction is shorter than a length w2 of the large-diameter hole 13 along the X-axis direction. In the present embodiment, a thickness t (length along the X-axis direction) of the side wall 32 is 1 mm, the length w1 of the small-diameter hole 12 is 0.23 mm, and the length w2 of the large-diameter hole 13 is 0.77 mm.

The window member 15 is made of a material (for example, germanium or the like) that transmits the laser light L having a wavelength in the mid-infrared region. The window member 15 is formed in a disk shape, and is disposed inside the large-diameter hole 13. The window member 15 has an incident surface 15a, an emitting surface 15b, and a side surface 15c. The incident surface 15a and the emitting surface 15b are surfaces intersecting the X-axis direction, and are formed in a circular shape. The incident surface 15a is a surface on an internal space S side, and is a surface on which the laser light L (in the present embodiment, the laser light L collimated by a lens 8) is incident. The emitting surface 15b is a surface opposite to the incident surface 15a (namely, an outer surface of the package 3), and a surface that emits the laser light L that has transmitted through the window member 15, to the outside of the package 3. The side surface 15c is a surface that connects the incident surface 15a and the emitting surface 15b, and that extends along the X-axis direction. In the present embodiment, a diameter of the window member 15 (the incident surface 15a or the emitting surface 15b) is 5.4 mm, and a thickness (length along the X-axis direction) of the window member 15 is 0.7 mm.

As shown in (A) and (B) of FIG. 7, the incident surface 15a includes a first region A1 and a second region A2. The first region A1 is a region which includes a central portion of the incident surface 15a and in which the anti-reflection film 151 (first anti-reflection film) is provided. The anti-reflection film 151 is a film member having a function of suppressing the reflection of the laser light L having a wavelength in the mid-infrared region on the incident surface 15a. The anti-reflection film 151 is made of, for example, a high refractive index material such as germanium (Ge) or silicon (Si), an intermediate refractive index material such as zinc sulfide (ZnS) or zinc selenide (ZnSe), or a low refractive index material such as yttrium fluoride (YF3), or is a dielectric multilayer film in which a plurality of substances having different refractive indexes that transmit mid-infrared light are alternately stacked. The anti-reflection film 151 is formed in a circular shape. A thickness (length along the X-axis direction) of the anti-reflection film 151 is determined according to the design of a transmission wavelength of the anti-reflection film 151 (wavelength of the laser light L that is transmitted). The thickness of the anti-reflection film 151 is, for example, 1.0 μm to 3.0 μm. For example, when a design value of the transmission wavelength is 5.2 μm, the thickness of the anti-reflection film 151 is set to, for example, 1.4 μm. In addition, in the present embodiment, a diameter of the anti-reflection film 151 (namely, a diameter of the first region A1) is 4.2 mm.

The second region A2 is a region formed in an annular shape to be separated from the first region A1 and to surround the first region A1. The second region A2 is metallized by the metal film 153. The metal film 153 is made of a material suitable for solder joining (namely, a material having good compatibility with a solder member 16 to be described later). The metal film 153 is made of, for example, Cr/Ni/Au (0.2 μm/0.5 μm/0.5 μm). In the present embodiment, an inner diameter of the metal film 153 (namely, an inner diameter of the second region A2) formed on the incident surface 15a is 4.5 mm. Namely, in the present embodiment, an annular region having a width of 0.15 mm in which the incident surface 15a (germanium base material) is exposed is formed between an outer edge of the first region A1 and an inner edge of the second region A2.

As shown in (B) of FIG. 7, the side surface 15c includes a third region A3 metallized to be continuous with the second region A2. Namely, the metal film 153 is continuously provided from the second region A2 to the side surface 15c.

As shown in (B) and (C) of FIG. 7, the emitting surface 15b includes a fourth region A4 in which the anti-reflection film 152 (second anti-reflection film) is provided. The anti-reflection film 152 is a film member having a function of suppressing the reflection of the laser light L having a wavelength in the mid-infrared region on the emitting surface 15b. The anti-reflection film 152 is formed in a circular shape from the same material as that of the anti-reflection film 151. In the present embodiment, a diameter of the anti-reflection film 152 (namely, a diameter of the fourth region A4) is 4.6 mm. Namely, the fourth region A4 is a region that includes the first region A1 and that is larger than the first region A1 when viewed in the X-axis direction.

The window member 15 is directly joined to the side wall 32 (portion 322). Specifically, the second region A2 of the incident surface 15a (namely, a region metallized by the metal film 153) is joined to the counterbore surface 14 through the solder member 16 formed in an annular shape. The solder member is a joining material having a melting point of 450° C. or lower. The solder member 16 is made of, for example, a SnAgCu-based solder material having a melting point of 220° C. The solder member 16 is a sheet-shaped member that is originally formed in an annular shape (refer to FIG. 16).

In the present embodiment, a thickness of the solder member 16 before soldering (namely, in the state of an annular sheet) is 0.1 mm, an outer diameter thereof is 5.5 mm, and an inner diameter thereof is 4.2 mm. Namely, in the present embodiment, the inner diameter (4.2 mm) of the solder member 16 is equal to the diameter (4.2 mm) of the first region A1, and the first region A1 and the solder member 16 do not overlap each other. In addition, the first region A1 in which the anti-reflection film 151 is formed and the second region A2 in which the metal film 153 is formed are separated from each other. In such a manner, since the first region A1 and the second region A2 are completely separated from each other, and the region in which the base material (in the present embodiment, germanium base material) of the window member 15 is exposed exists between the first region A1 and the second region A2, during soldering, the solder member 16 is unlikely to flow onto the first region A1 (onto the anti-reflection film 151). On the other hand, the solder member 16 is likely to wet-spread on the metal film 153 having high compatibility with the solder member 16. Accordingly, stress generated when the solder member 16 is melted or solidified during soldering is unlikely to be transmitted to the anti-reflection film 151 on the first region A1.

In addition, as described above, since the solder member 16 wet-spreads on the metal film 153, some of the solder member 16 also wraps around onto the third region A3 (refer to FIG. 5). Namely, some of the solder member 16 enters a gap between the side surface 15c and an inner surface of the large-diameter hole 13. Namely, at least a part of the side surface 15c of the window member 15 is joined to at least a part of the inner surface of the large-diameter hole 13 through the solder member 16. Accordingly, the airtightness of the package 3 at an attachment portion of the window member 15 is effectively enhanced.

In the present embodiment, the emitting surface 15b of the window member 15 is substantially flush with an outer surface 32a of the side wall 32 (outer surface of the package 3) on which the light-emitting window 11 is provided. Namely, the length w2 of the large-diameter hole 13 (namely, a depth of counterbore processing) is adjusted such that the emitting surface 15b is substantially flush with the outer surface 32a of the side wall 32.

Next, each member accommodated in the package 3 will be described. The internal space S formed by the package 3 mainly accommodates the Peltier module 4, a heat spreader 5, a heat sink 6, a submount 7, the lens 8, a lens holder 9, and a temperature sensor T (refer to FIG. 10) in addition to the QCL element 2.

The Peltier module 4 is a temperature control element that adjusts the temperature of the QCL element 2. Specifically, the Peltier module 4 has a cooling and heating function of keeping the temperature of the QCL element 2 at a temperature corresponding to the oscillation wavelength of the QCL element 2. Temperature control by the Peltier module 4 is performed based on the temperature of the QCL element 2 measured by the temperature sensor T (refer to FIG. 10) to be mounted on the heat sink 6.

As shown in FIG. 8, the Peltier module 4 includes a plurality of Peltier elements 41 that are thermoelectric semiconductor elements, and a pair of ceramic substrates 42 and 43 that sandwich the plurality of Peltier elements 41 therebetween from above and below. The ceramic substrate 42 is provided on a top wall 33 side with respect to the Peltier elements 41, and the ceramic substrate 43 is provided on the bottom wall 31 side with respect to the Peltier elements 41. Each of the ceramic substrates 42 and 43 is made of, for example, alumina. An outer surface of each of the ceramic substrates 42 and 43 (surface opposite to a Peltier element 41 side) is a metallized surface on which a metal film 44 made of Cu/Ni/Au or the like is formed by plating. An In foil 45 that is a solder member is provided on the outer surface of each of the ceramic substrates 42 and 43 with the metal film 44 interposed therebetween. The ceramic substrate 42 is solder joined to the heat spreader 5 through the In foil 45. On the other hand, the ceramic substrate 43 is solder joined to an upper surface 31c (surface facing the top wall 33) of the bottom wall 31 of the package 3 through the In foil 45. Two lead wires 20 for allowing a direct current to flow to the Peltier module 4 are electrically connected to one ceramic substrate (in the present embodiment, the ceramic substrate 43). The two lead wires 20 are connected to different respective lead pins 10.

The heat spreader 5 is a member to be mounted on the Peltier module 4, and dissipates heat generated by the QCL element 2, to a Peltier module 4 side. The heat spreader 5 is made of, for example, a material having good thermal conductivity such as copper. As shown in FIG. 9, the heat spreader 5 has a bottom surface 51 to be solder joined to the Peltier module 4 through the In foil 45 (refer to FIG. 8) provided on the ceramic substrate 42; a first upper surface 52 on which the heat sink 6 and the submount 7 are to be mounted; and a second upper surface 53 (second attachment surface) on which the lens holder 9 is to be mounted.

Here, a thermal expansion coefficient of copper (approximately $17 \times 10^{-6}$/K) is larger than a thermal expansion coefficient of alumina (approximately $7 \times 10^{-6}$/K). For this reason, when the ceramic substrate 42 of the Peltier module 4 is made of alumina and the heat spreader 5 is made of copper, if the entirety of the bottom surface 51 of the heat spreader 5 is joined to the ceramic substrate 42 through the In foil 45, cracks might occur in the Peltier elements 41 because of a large difference in temperature or the like between upper surfaces and lower surfaces of the Peltier elements 41 during the long-term use, temperature control, or the like of the quantum cascade laser device 1, which is a problem.

Therefore, in the present embodiment, groove portions 51a that divide a surface to be joined to the Peltier module 4 into a plurality of segments are formed in the bottom surface 51 of the heat spreader 5. In the present embodiment, as one example, two groove portions 51a extend along the lateral direction (Y-axis direction) at positions where the bottom surface 51 is divided into three segments in the longitudinal direction (X-axis direction). The surface to be joined to the Peltier module 4 is substantially evenly into three segments by the two groove portions 51a. In such a manner, since the surface to be joined to the Peltier module 4 is divided into a plurality (here, three) of segments, the stress caused by a difference in thermal expansion coefficient between the material (alumina) of the ceramic substrate 42 and the material (copper) of the heat spreader 5 is reduced, and the occurrence of cracks in the Peltier elements 41 described above is suppressed.

In addition, four corners (vertexes) of the Peltier module 4 are weak particularly in mechanical strength. Therefore, in the present embodiment, cutout grooves 51b are formed at four corners of the bottom surface 51 of the heat spreader 5. Accordingly, the ceramic substrate 42 and the bottom surface 51 of the heat spreader 5 can be prevented from being joined to each other at portions corresponding to the four corners of the Peltier module 4, and the stress on the four corners of the Peltier module 4 caused by the difference in thermal expansion coefficient can be effectively reduced.

Incidentally, the groove portions 51a and the cutout grooves 51b described above also function as escape routes of air layers (voids) that are mixed when the ceramic substrate 42 and the bottom surface 51 are solder joined to each other through the In foil 45. Accordingly, the quality of joining and the thermal conductivity between the Peltier module 4 (ceramic substrate 42) and the heat spreader 5 can be improved.

In addition, since a soft solder material such as In or InSn (in the present embodiment, In) is used as a solder member that joins the Peltier module 4 (ceramic substrate 42) and the heat spreader 5, the stress of expansion or contraction by heat can be suitably absorbed, and the reliability of the quantum cascade laser device 1 can be improved.

The first upper surface 52 is located at a position higher than that of the second upper surface 53 (top wall 33 side). In the present embodiment, as one example, the first upper surface 52 is provided with two screw holes 52a for screwing the heat sink 6 and with a protrusion portion 52b protruding upward (top wall 33 side). The protrusion portion 52b extends along the lateral direction (Y-axis direction) at an end portion of the first upper surface 52 in the longitudinal direction (X-axis direction) (end portion opposite to a second upper surface 53 side). The protrusion portion 52b is a portion that comes into contact with an end portion of the heat sink 6 to position the heat sink 6.

The second upper surface 53 is provided with a plurality (in the present embodiment, four) of protrusions 53a (second protrusions) formed in an island shape. The four protrusions 53a are portions to be joined to the lens holder 9 to be described later.

The heat sink 6 is a member to be mounted on the first upper surface 52 of the heat spreader 5. Similarly to the heat spreader 5, the heat sink 6 is made of, for example, a material having good thermal conductivity such as copper. The heat sink 6 is formed in a substantially rectangular parallelepiped shape. For example, a width of the heat sink 6 along the X-axis direction is 5 mm, and a width of the heat sink 6 along the Y-axis direction is 6 mm. As shown in FIG. 10, the submount 7 on which the QCL element 2 is mounted, the temperature sensor T that measures a temperature of the QCL element 2, and ceramic patterns SP for wiring wires are mounted on an upper surface 6a (surface on the top wall 33 side) of the heat sink 6. A lower surface 6b of the heat sink 6 is in contact with the first upper surface 52 of the heat spreader 5. In order to enable the QCL element 2 to be easily replaced when a defect occurs in the QCL element 2, the heat sink 6 is fixed to the heat spreader 5 with screws. Screw holes 6c penetrating through the heat sink 6 in the Z-axis direction, and counterbore grooves 6d formed around the screw holes 6c are formed in the heat sink 6 for such screwing. The screw holes 6c are provided at positions corresponding to the screw holes 52a (refer to FIG. 9) of the heat spreader 5 described above. For example, the heat sink 6 is fixed to the heat spreader 5 by inserting screw members (not shown) into the screw holes 6c and into the screw holes 52a, screw tips of the screw members being coated with a screw locking agent (adhesive agent for preventing the loosening of screws). Each of the counterbore grooves 6d is a groove portion provided to accommodate a head of the screw member. Incidentally, as the screw locking agent, a thermosetting resin adhesive agent that does not generate outgas (for example, epoxy resin or the like) is suitably used.

The temperature sensor T and the ceramic patterns SP are electrically connected to predetermined lead pins 10 through wires (not shown). In addition, the QCL element 2 is electrically connected to a predetermined lead pin 10 through the ceramic patterns SP and through wires (not shown). Accordingly, electric power is supplied from an external power supply device to the QCL element 2 and to the temperature sensor T through the lead pins 10.

The submount 7 is a rectangular plate-shaped member on which the QCL element 2 is to be placed. The QCL element 2 is placed on the submount 7 such that the optical axis of the laser light L emitted from the end surface 2a coincides with a center of the light-emitting window 11 (namely, the central axes of the small-diameter hole 12 and the large-diameter hole 13). The submount 7 is made of a material having a thermal expansion coefficient close to that of the QCL element 2 (for example, aluminum nitride or the like). The QCL element 2 and the submount 7 are joined to each other through, for example, an AnSn-based solder material. In addition, the submount 7 and the heat sink 6 are joined to each other through, for example, a SnAgCuNiGe-based solder material.

Subsequently, the lens 8 and the lens holder 9 will be described with reference to FIGS. 11 to 15. As described above, the laser light L has a relatively large beam radiation angle as per the principle of a quantum cascade laser (refer to FIG. 4). For this reason, in order to effectively use the laser light L, it is necessary to perform beam shaping (concentrating, collimating, or the like) of the laser light L using an optical element such as a lens. On the other hand, since the laser light L having an oscillation wavelength in the mid-infrared region is invisible, an expensive beam monitor, detector, or the like having sensitivity in the mid-infrared region is required to perform an alignment (position alignment) of the lens for the beam shaping. Therefore, in the present embodiment, the lens 8 for performing the beam shaping is built in inside the package 3 in advance. This configuration has an advantage that it is not necessary to perform an alignment of a lens (lens to be externally attached) on a user side.

The lens 8 is a member that concentrates or collimates the laser light L emitted from the QCL element 2. The lens holder 9 is a member that holds the lens 8. The lens 8 is disposed to face the end surface 2a that is the emitting surface of the QCL element 2 that emits the laser light L.

The lens 8 is, for example, an aspherical lens made of ZnSe. As shown in FIGS. 11 and 14, the lens 8 has an incident surface 8a, a side surface 8b, and an emitting surface 8c. The incident surface 8a is a surface on which the laser light L is incident. In the present embodiment, the incident surface 8a is a flat surface. The side surface 8b is a surface extending from an edge portion of the incident surface 8a along the optical axis direction (namely, the X-axis direction) of the laser light L. The emitting surface 8c is a surface that emits the laser light L that has passed through the lens 8. In the present embodiment, the emitting surface 8c is formed in a curved aspherical surface shape. In the present embodiment, a diameter of the lens 8 (diameter of the incident surface 8a) is 5 mm, and an effective diameter of the lens 8 is 4.5 mm. The effective diameter of the lens 8 is a diameter of an incident beam capable of satisfying optical characteristics of the lens on a plane (incident surface 8a) orthogonal to the optical axis direction (X-axis direction) of the laser light L (when the lens 8 is a collimating lens, a diameter of incident light that can be transmitted and collimated, as a specification of the lens). In addition, a region within the effective diameter of the lens 8 is referred to as an effective region.

As shown in FIG. 11, the lens holder 9 is a member having a substantially rectangular parallelepiped outer shape. The lens holder 9 is made of, for example, aluminum to which black alumite surface treatment is applied. A through-hole penetrating through the lens holder 9 along the X-axis direction is provided in a central portion of the lens holder 9 when viewed in the X-axis direction. The lens holder 9 has a small-diameter hole 9a (first hole portion) and a large-diameter hole 9b (second hole portion) that form the through-hole. Each of the small-diameter hole 9a and the large-diameter hole 9b extends in the X-axis direction. The large-diameter hole 9b is provided at a position farther from the QCL element 2 than the small-diameter hole 9a. Namely, the small-diameter hole 9a is provided on a QCL element 2 side with respect to the large-diameter hole 9b. The large-diameter hole 9b is shaped to include the small-diameter hole 9a and to be larger than the small-diameter hole 9a when viewed in the X-axis direction. The large-diameter hole 9b is formed in a larger size than the outer shape of the lens 8 such that the lens 8 can be accommodated inside the large-diameter hole 9b. In the present embodiment, each of the small-diameter hole 9a and the large-diameter hole 9b is formed in a circular shape. The small-diameter hole 9a and the large-diameter hole 9b are connected to each other by a counterbore surface 9c having an annular shape and extending along a plane intersecting the X-axis direction (Y-Z plane). More specifically, the counterbore surface 9c connects an end portion on a large-diameter hole 9b side of the small-diameter hole 9a and an end portion on a small-diameter hole 9a side of the large-diameter hole 9b. Incidentally, in the present embodiment, the counterbore surface 9c is formed in a continuous annular shape, but the counterbore surface 9c may be formed in a discontinuous annular shape. For example, a cutout may be formed at a part of an inner wall surface of the small-diameter hole 9a to divide the counterbore surface 9c at the portion at which the cutout is formed.

As shown in FIGS. 11 and 12, a groove portion 9d (recess) that extends from an end portion on an opposite side of the lens holder 9 from the QCL element 2 side to reach the counterbore surface 9c is formed in an inner surface of the large-diameter hole 9b along the X-axis direction. In the present embodiment, a pair of the groove portions 9d facing each other along one diagonal line of the lens holder 9 having a rectangular shape when viewed in the X-axis direction are formed.

As shown in FIGS. 12 and 14, a central axis AX1 of the small-diameter hole 9a does not coincide with a central axis AX2 of the large-diameter hole 9b. Namely, the central axis AX1 of the small-diameter hole 9a is eccentric from the central axis AX2 of the large-diameter hole 9b. Incidentally, in FIG. 14, the pair of groove portions 9d are ignored for easy understanding of the description. Namely, FIG. 14 is a view in which the large-diameter hole 9b is not provided with the pair of groove portions 9d, and schematically shows a cross-sectional structure taken along line XIV-XIV of FIG. 12.

In the present embodiment, the central axis AX1 of the small-diameter hole 9a is offset with respect to the central axis AX2 of the large-diameter hole 9b in a direction D. The direction D is a direction from one groove portion 9d toward the other groove portion 9d when viewed in the X-axis direction. In addition, a diameter d3 of the small-diameter hole 9a is the same as the effective diameter of the lens 8 and is 4.5 mm, and a diameter d4 of the large-diameter hole 9b is 5.15 mm. In addition, as described above, since the central axis AX1 is eccentric with respect the central axis AX2, as shown in FIGS. 12 and 14, a width of the counterbore surface 9c on a central axis AX1 side (here, a portion excluding the groove portion 9d) on a straight line passing through the central axis AX1 and through the central axis AX2 is a minimum width wmin of the counterbore surface 9c. In addition, a width of the counterbore surface 9c on a central axis AX2 side (here, a portion excluding the groove portion 9d) on the straight line passing through the central axis AX1 and through the central axis AX2 is a maximum width wmax of the counterbore surface 9c. In the present embodiment, the minimum width wmin is 0.25 mm, the maximum width wmax is 0.4 mm, and a distance d between the central axis AX1 and the central axis AX2 is 0.075 mm.

An edge portion of the incident surface 8a of the lens 8 is in contact with the counterbore surface 9c. In addition, in the lens 8, the side surface 8b of the lens 8 is positioned with respect to the inner surface of the large-diameter hole 9b along the direction D from the central axis AX2 of the large-diameter hole 9b toward the central axis AX1 of the small-diameter hole 9a. Specifically, the side surface 8b of the lens 8 is abutted against the inner surface of the large-diameter hole 9b along the direction D. Accordingly, a central axis AX3 of the lens 8 is disposed at a position closer to the central axis AX1 of the small-diameter hole 9a than to the central axis AX2 of the large-diameter hole 9b. In the present embodiment, the diameter (5 mm) and the effective diameter (4.5 mm) of the lens 8, the diameter d3 (4.5 mm) of the small-diameter hole 9a, the diameter d4 (5.15 mm) of the large-diameter hole 9b, and the distance d (0.075 mm) between the central axis AX1 and the central axis AX2 are set as described above. Accordingly, the central axis AX3 of the lens 8 substantially coincides with the central axis AX1 of the small-diameter hole 9a. Namely, when viewed in the X-axis direction, the entirety of the effective region of the lens 8 overlaps the small-diameter hole 9a. In other words, the entirety of the effective region of the lens 8 is exposed to the QCL element 2 side through the small-diameter hole 9a. Accordingly, it is possible to make the most use of the effective region of the lens 8.

Next, a method for fixing the lens 8 to the lens holder 9 will be described. As shown in FIG. 14, at least a part of the side surface 8b of the lens 8 is fixed to the inner surface of the large-diameter hole 9b through a resin adhesive agent B1 in a state where the lens 8 is positioned with respect to the lens holder 9 as described above. The resin adhesive agent B1 is made of, for example, a thermosetting resin such as epoxy resin. For example, the resin adhesive agent B1 is poured into the groove portions 9d, so that the resin adhesive agent B1 that has entered the groove portions 9d also pours into a gap between the side surface 8b of the lens 8 and the inner surface of the large-diameter hole 9b on peripheries of the groove portions 9d because of the capillary phenomenon. In addition, the resin adhesive agent B1 also flows into a gap between the incident surface 8a of the lens 8 and the counterbore surface 9c because of the capillary phenomenon. The resin adhesive agent B1 is cured and the lens 8 is fixed to the lens holder 9 by performing the bake processing of the lens holder 9 in this state. A process of pouring the resin adhesive agent B1 into the groove portion 9d is performed, for example, by inserting a needle member for coating the resin adhesive agent B1 into the groove portion 9d, and by injecting the resin adhesive agent B1 from a tip of the needle member toward the counterbore surface 9c in the groove portion 9d. In this case, the groove portions 9d may be formed in such a size that the needle member can be inserted thereinto.

Effects obtained by a structure in which the central axis AX1 of the small-diameter hole 9a is eccentric with respect to the central axis AX2 of the large-diameter hole 9b in the direction D and the lens 8 is positioned along the direction D (hereinafter, referred to as a "eccentric structure") will be described in detail with reference to FIG. 15. FIG. 15 is a view schematically showing a positional relationship between the lens 8 and a lens holder 900 when the lens holder 900 according to a comparative example is used. In the lens holder 900, the central axis AX1 of the small-diameter hole 9a is not eccentric with respect to the central axis AX2 of the large-diameter hole 9b. Namely, the central axis AX1 and the central axis AX2 coincide with each other. In this case, in order to make the most use of the effective diameter of the lens 8, as shown in a left part of FIG. 15, it is necessary to cause the central axis AX3 of the lens 8 to coincide with a central axis (namely, the central axes AX1 and AX2) of the lens holder 900. No problem occurs as long as such a relationship between the lens 8 and the lens holder 900 is maintained. However, in reality, when the lens 8 is installed at a center of the lens holder 900 in such a manner, and the side surface 8b of the lens 8 and the inner surface of the large-diameter hole 9b are joined to each other through the resin adhesive agent B1, as shown in a right part of FIG. 15, when bake processing is performed, the central axis AX3 of the lens 8 might be offset from the central axis (central axes AX1 and AX2) of the lens holder 9 because of the surface tension of the resin adhesive agent B1, which is a problem. Specifically, since the amount of the resin adhesive agent B1 with which the gap between the side surface 8b of the lens 8 and the large-diameter hole 9b is filled is not always uniform, a phenomenon can occur in which the lens 8 moves in a direction in which the surface tension of the resin adhesive agent B1 acts strongly. When such movement (positional offset) of the lens 8 occurs, a part of the effective region of the lens 8 overlaps the counterbore surface 9c, and it is not possible to make the most use of the effective region. Namely, as shown in the right part of FIG. 15, when the central axis AX3 of the lens 8 and the optical axis of the laser light L emitted from the QCL element 2 are disposed to coincide with each other, light fluxes of the laser light L cannot be captured in a portion of the effective region of the lens 8 overlapping the counterbore surface 9c.

On the other hand, according to the eccentric structure shown in FIGS. 12 and 14, the side surface 8b of the lens 8 can be brought into close contact with the inner surface of the large-diameter hole 9b along the direction D in advance, the inner surface serving as an installation end of the lens 8. Then, the closer the distance between the side surface 8b of the lens 8 and the inner surface of the large-diameter hole 9b at portions (namely, portions in close contact and a periphery thereof) is, the stronger the surface tension of the resin adhesive agent B1 acts. For this reason, even when bake processing is performed, the lens 8 is not pulled back opposite to the direction D with respect to the lens holder 9. Namely, before and after the bake processing, a state where the side surface 8b of the lens 8 is abutted against the inner surface of the large-diameter hole 9b along the direction D (refer to FIGS. 12 and 14) is maintained. Therefore, according to the eccentric structure, it is possible to make the most use of the effective region of the lens 8 by adjusting dimensions such that the effective region of the lens 8 and the small-diameter hole 9a coincide with each other in a state where the lens 8 is positioned as described above.

Incidentally, a portion of the side surface 8b of the lens 8 and the inner surface of the large-diameter hole 9b do not necessarily need to be in direct contact with each other, the portion being abutted against the inner surface of the large-diameter hole 9b. Namely, as shown in FIG. 14, the resin adhesive agent B1 that has slightly entered a gap between the portion of the side surface 8b of the lens 8 and the inner surface of the large-diameter hole 9b because of the capillary phenomenon may be interposed therebetween, the portion being abutted against the inner surface of the large-diameter hole 9b.

As shown in FIGS. 11, 12, and (B) of 13, a wall portion 90 (namely, a tubular portion extending along the X-axis direction) forming the large-diameter hole 9b of the lens holder 9 includes a bottom wall portion 92 (first wall portion) facing the second upper surface 53 of the heat spreader 5. The bottom wall portion 92 has a lower surface 92a (first attachment surface) facing the second upper surface 53. A plurality (in the present embodiment, four) of protrusions 92b (first protrusions) protruding to a heat spreader 5 side are formed on the lower surface 92a. The four protrusions 92b are provided at positions corresponding to the four protrusions 53a (refer to (A) of FIG. 9) provided on the second upper surface 53 of the heat spreader 5. The protrusions 92b are joined to the respective protrusions 53a through an adhesive layer B2 (refer to FIG. 2) made of a UV curable resin (photocurable resin).

In the present embodiment, the four protrusions 92b are disposed at four corners of the bottom wall portion 92 in a well-balanced manner. Namely, the four protrusions 92b are disposed such that a center of the four protrusions 92b substantially coincides with a center of the bottom wall portion 92 when viewed in the Z-axis direction. Accordingly, the lens holder 9 can be stably fixed onto the second upper surface 53 of the heat spreader 5, and a structure that is resistant to impact, vibration, and the like can be realized.

As shown in FIGS. 11 and (A) of 13, the wall portion 90 includes a top wall portion 91 (second wall portion) facing the top wall 33 of the package 3. The top wall portion 91 faces the bottom wall portion 92 through the large-diameter hole 9b. A cutout 91a is formed at an end portion on an opposite side of the top wall portion 91 from the small-diameter hole 9a side. In addition, a cutout 92c is formed at an end portion on an opposite side of the bottom wall portion 92 from the small-diameter hole 9a side. When viewed in the Z-axis direction, the cutout 91a and the cutout 92c include portions overlapping each other. Namely, the top wall portion 91 is formed not to overlap at least a part of the cutout 92c of the bottom wall portion 92 in a direction in which the bottom wall portion 92 and the top wall portion 91 face each other (Z-axis direction). A part of the second upper surface 53 of the heat spreader 5 can be visually recognized from above the top wall portion 91 through a portion at which the cutout 91a and the cutout 92c overlap each other. Namely, the second upper surface 53 of the heat spreader 5 can be irradiated with light from above the top wall portion 91 through the portion. According to such a configuration, UV light can be suitably guided to a space between the lower surface 92a of the lens holder 9 and the second upper surface 53 of the heat spreader 5 by placing the lens holder 9 on the second upper surface 53 of the heat spreader 5 such that the positions of the four protrusions 53a and the positions of the four protrusions 92b are aligned with each other, and then by irradiating the second upper surface 53 with the UV light from above the lens holder 9. Accordingly, the adhesive layer B2 provided between each of the protrusions 92b and the corresponding protrusion 53a can be appropriately cured.

In addition, since locations to be coated with the adhesive layer B2 are defined by each of the protrusions 92b and each of the protrusions 53a formed in an island shape, the locations to be coated with the adhesive layer B2 and the coating amount of the adhesive layer B2 can be equalized among a plurality of products (quantum cascade laser devices 1). In addition, there is a limit to the depth by which UV light penetrates into a UV curable resin. For this reason, if the entirety of the lower surface 92a is coated with the UV curable resin without providing the protrusions 92b and the protrusions 53a, a problem that the UV light does not reach the inside of the UV curable resin (center side) and the UV curable resin cannot be completely cured can occur. Such a problem can be avoided by defining the locations to be coated with the adhesive layer B2 in an island shape as described above. In addition, since the protrusions 92b and the protrusions 53a are provided in an island shape, a sufficient space for the passing of the UV light can be formed between the lower surface 92a and the second upper surface 53 at positions where the protrusions 92b and the protrusions 53a do not overlap each other. Accordingly, the UV light that has entered the space can be reflected by valleys (portions at which the protrusions 92b and the protrusions 53a are not formed) of each of the lower surface 92a and the second upper surface 53, and the adhesive layer B2 on each of the protrusions 53a can be irradiated with the UV light.

Next, a method for manufacturing the quantum cascade laser device 1 (assembly method) will be described. As shown in FIG. 16, first, the package 3 before the top wall 33 is joined to the side wall 32 is prepared. Subsequently, the window member 15 (window member 15 on which the anti-reflection films 151 and 152 and the metal film 153 are provided in advance (refer to FIG. 7)) is joined to the side wall 32. Specifically, the solder member 16 that is an annular sheet member molded in a washer shape is sandwiched between the counterbore surface 14 and the window member 15. Then, a load is applied to the window member 15 from the outside of the package 3 to push the window member 15 against the counterbore surface 14. In this state, the window member 15 and the counterbore surface 14 are joined to each other through the solder member 16 by using, for example, a vacuum soldering device (vacuum soldering furnace). At this time, a jig for aligning a center of the window member 15 with the central axes of the counterbore openings (the small-diameter hole 12 and the large-diameter hole 13) may be used.

Subsequently, the heat spreader 5 is placed on the Peltier module 4 to the top and the bottom of which the In foils 45 that are solder members are affixed, and these members are disposed on the bottom wall 31 at a predetermined position using a jig. Then, a load is applied from above the heat spreader 5 to push these members against the bottom wall 31. In this state, the bottom wall 31, the Peltier module 4, and the heat spreader 5 are joined to each other through the In foils 45 disposed between these members, by using, for example, a vacuum soldering device. Subsequently, as shown in FIG. 2, the lead wires 20 of the Peltier module 4 are solder joined to the lead pins 10.

Subsequently, the heat sink 6 on which elements such as the QCL element 2, the submount 7, the temperature sensor T, and the ceramic patterns SP are mounted in advance is fixed to the first upper surface 52 of the heat spreader 5. Specifically, the heat sink 6 is screwed to the heat spreader 5 by inserting screw members (not shown) into the screw holes 6c of the heat sink 6 (refer to FIG. 10) and into the screw holes 52a of the heat spreader 5. In addition, the temperature sensor T and the ceramic patterns SP are electrically connected to the predetermined lead pins 10 by wires (not shown).

Subsequently, the lens holder 9 on which the lens 8 is mounted as described above is fixed to the second upper surface 53 of the heat spreader 5. Specifically, each of the protrusions 53a formed on the second upper surface 53 of the heat spreader 5 is coated with a UV curable resin (adhesive layer B2) in advance. Then, the lens holder 9 is vacuum-chucked using, for example, Convum (vacuum generator) or the like, and is moved into the package 3. Then, the QCL element 2 is driven to emit the laser light L, and an active alignment is performed to align the optical axis of the laser light L and the central axis of the lens 8 with each other while observing the laser light L using a beam monitor.

Subsequently, the lens holder 9 is fixed to the heat spreader 5 in a state where the positions of the optical axis of the laser light L and the central axis of the lens 8 are aligned with each other. Specifically, in a state where the optical axis of the laser light L and the central axis of the lens 8 are aligned with each other, the second upper surface 53 of the heat spreader 5 is irradiated with UV light from above the lens holder 9 through the cutout 91a and the cutout 92c of the lens holder 9. Accordingly, each of the protrusions 92b of the lens holder 9 and the corresponding protrusion 53a of the heat spreader 5 are joined to each other through the adhesive layer B2.

Here, the position of each of the protrusions 92b is designed so as to overlap the corresponding protrusion 53a of the heat spreader 5 in a state where the optical axis of the laser light L and the central axis of the lens 8 are aligned with each other. In addition, the height dimension (length along the Z-axis direction) of each of the protrusions 53a and each of the protrusions 92b is designed such that a gap of approximately several hundreds of μm smaller than the thickness of the UV curable resin (adhesive layer B2) coated on each of the protrusions 53a in advance is formed between each of the protrusions 53a of the heat spreader 5 and the corresponding protrusion 92b of the lens holder 9 in a state where the optical axis of the laser light L and the central axis of the lens 8 are aligned with each other. Accordingly, when the lens holder 9 is moved with respect to the heat spreader 5 to align the optical axis of the laser light L and the central axis of the lens 8 with each other, an adjustment is made such that each of the protrusions 92b of the lens holder 9 and the adhesive layer B2 on the corresponding protrusion 53a of the heat spreader 5 come into contact with each other. In other words, the height dimension of each of the protrusions 53a and each of the protrusions 92b and the thickness of the adhesive layer B2 are designed such that the optical axis of the laser light L and the central axis of the lens 8 are aligned with each other in a state where the lens holder 9 is pushed against the UV curable resin (adhesive layer B2) coated on the heat spreader 5 in advance.

Subsequently, an upper end portion of the side wall 32 of the package 3 (end portion opposite to the bottom wall 31 side) is joined to the top wall 33. As described above, the quantum cascade laser device 1 shown in FIG. 1 is obtained.

In the quantum cascade laser device 1 described above, the light-emitting window 11 is joined to the side wall 32 of the package 3 by the solder member 16 (in the present embodiment, an SnAgCu-based solder material having a melting point of 220° C.) having a lower melting point than that of a brazing material (melting point is 450° C. or higher). Accordingly, compared to when the brazing material is used, the window member 15 and the counterbore surface 14 can be brought into close contact with each other while suppressing damage to the window member 15 and the like (particularly, the anti-reflection films 151 and 152) caused by heat. In addition, the first region A1 in which the anti-reflection film 151 is provided and the second region A2 to which the solder member 16 is joined are separated from each other on the incident surface 15a of the window member 15 (refer to FIG. 7). Accordingly, stress generated in the second region A2 when the solder member 16 is melted or solidified is prevented from being transmitted to the anti-reflection film 151 on the first region A1. As a result, damage (crack, peeling, or the like) to the anti-reflection film 151 caused by the stress is suppressed. As described above, according to the quantum cascade laser device 1, damage to the anti-reflection film 151 provided on the light-emitting window 11 can be suppressed, and high airtightness of the package 3 can be secured.

In addition, the side surface 15c of the window member 15 includes the third region A3 metallized to be continuous with the second region A2, and at least a part of the side surface 15c is joined to at least a part of the inner surface of the large-diameter hole 13 through the solder member 16 (refer to FIG. 5). According to this configuration, since a region that is continuous from the second region A2 to the side surface 15c of the window member 15 (third region A3) is metallized, when solder joining is performed, some of the solder member 16 suitably wet-spreads to a third region A3 side. As a result, the solder member 16 can be interposed between the side surface 15c of the window member 15 and the inner surface of the large-diameter hole 13, and the airtightness of the package 3 can be suitably improved.

In addition, the wavelength of the laser light L emitted from the QCL element 2 is included within a range of 4 μm to 12 μm. As one example, the heat-resistant temperature of the anti-reflection films 151 and 152 is approximately 260° C. On the other hand, in the quantum cascade laser device 1, since the solder member 16 having a relatively low melting point is used as a joining material, the window member 15 on which the anti-reflection films 151 and 152 are provided can be attached to the side wall 32 by solder joining while suppressing damage to the anti-reflection films 151 and 152 caused by heat.

In addition, in the quantum cascade laser device 1, the lens holder 9 has the small-diameter hole 9a and the large-diameter hole 9b of which the central axes AX1 and AX2 are eccentric with respect to each other. In addition, the side surface 8b of the lens 8 is positioned with respect to the inner surface of the large-diameter hole 9b along the direction D from the central axis AX2 of the large-diameter hole 9b toward the central axis AX1 of the small-diameter hole 9a. Accordingly, the positional offset of the lens 8 (movement of the lens 8 with respect to the lens holder 9) that may be caused by the surface tension of the resin adhesive agent B1 disposed around the lens 8 in case that the lens 8 is disposed at a central portion of the large-diameter hole 9b (for example, refer to the left part of FIG. 15) can be suitably suppressed. Further, in a state where the lens 8 is positioned in such a manner, the central axis AX3 of the lens 8 is disposed at a position close to the central axis AX1 of the small-diameter hole 9a (in the present embodiment, the central axis AX3 and the central axis AX1 coincide with each other). Accordingly, the area of a region in which the effective region of the lens 8 (region within the effective diameter around the central axis AX3 of the lens) and the counterbore surface 9c interfere with (overlap) each other can be reduced. As a result, the effective region of the lens 8 can be efficiently used. In addition, since the effective region of the lens 8 can be efficiently used, the size of the lens 8 can be reduced, and the size of the package 3 can be reduced.

In addition, in the present embodiment, the central axis AX3 of the lens 8 substantially coincides with the central axis AX1 of the small-diameter hole 9a, and the effective diameter of the lens 8 substantially coincides with the diameter d3 of the small-diameter hole 9a. According to this configuration, the entirety of the effective region (region within the effective diameter) of the lens 8 can be exposed through the small-diameter hole 9a. Accordingly, the size of the small-diameter hole 9a is suppressed to its minimum to secure the area of the counterbore surface 9c, so that it is possible to make the most use of the effective region of the lens 8 while appropriately supporting the edge portion of the incident surface 8a of the lens 8.

In addition, the groove portions 9d that reach the counterbore surface 9c along the X-axis direction are formed in the inner surface of the large-diameter hole 9b, and the resin adhesive agent B1 enters the groove portions 9d. According to this configuration, the resin adhesive agent B1 can be easily injected into the gap between the side surface 8b of the lens 8 and the inner surface of the large-diameter hole 9b through the groove portions 9d.

In addition, the lens holder 9 has the lower surface 92a on which the plurality (in the present embodiment, four) of protrusions 92b protruding to the heat spreader 5 side are formed, and the plurality of protrusions 92b are joined to the second upper surface 53 of the heat spreader 5 through the adhesive layer B2 made of a UV curable resin. In the present embodiment, the plurality of protrusions 53a protruding to a lens holder 9 side are formed on the second upper surface 53 at the positions corresponding to the plurality of protrusions 92b, and the plurality of protrusions 92b are joined to the plurality of protrusions 53a through the adhesive layer B2. According to this configuration, since locations where the adhesive layer B2 is provided can be dispersed onto the plurality of protrusions 92b, the adhesive layer B2 on each of the protrusions 92b can be easily and appropriately cured compared to when the adhesive layer B2 is provided in a wide range on the entire surface. Further, in the present embodiment, the adhesive layer B2 is disposed at a central portion of the space formed between the lower surface 92a and the second upper surface 53 (between the protrusions 92b and the protrusions 53a). Accordingly, the adhesive layer B2 can be suitably irradiated with UV light reflected by the lower surface 92a and by the second upper surface 53 in the space. As a result, the adhesive layer B2 can be more appropriately cured, and the lens holder 9 can be stably fixed to the heat spreader 5.

In addition, the bottom wall portion 92 of the lens holder 9 is provided with the cutout 92c for guiding light to the second upper surface 53 of the heat spreader 5. According to this configuration, the second upper surface 53 of the heat spreader 5 can be irradiated with UV light from a side opposite to a side on which the heat spreader 5 is disposed with respect to the lens holder 9 (namely, from above the lens holder 9), through the cutout 92c provided in the bottom wall portion 92. Accordingly, light irradiation for curing the adhesive layer B2 between the lower surface 92a and the second upper surface 53 can be easily performed.

In addition, the lens holder 9 includes the top wall portion 91 facing the bottom wall portion 92 through the large-diameter hole 9b. Then, the top wall portion 91 is formed not to overlap at least a part of the cutout 92c provided in the bottom wall portion 92 when viewed in the direction in which the bottom wall portion 92 and the top wall portion 91 face each other (Z-axis direction). According to this configuration, the lens 8 disposed in the large-diameter hole 9b can be appropriately protected from the outside by the bottom wall portion 92 and the top wall portion 91. In addition, since the top wall portion 91 is formed not to overlap at least a part of the cutout 92c provided in the bottom wall portion 92, the second upper surface 53 of the heat spreader 5 can be irradiated with light by irradiating the lens holder 9 with the light from the outside of the lens holder 9 (side opposite to the bottom wall portion 92 with the top wall portion 91 sandwiched therebetween).

In addition, instead of the cutout 92c, a through-hole penetrating through the bottom wall portion 92 in the Z-axis direction may be formed in the bottom wall portion 92. Similarly, instead of the cutout 91a, a through-hole penetrating through the top wall portion 91 in the Z-axis direction and including a portion overlapping the cutout 92c or the through-hole provided in the bottom wall portion 92 may be formed in the top wall portion 91. Even with such a configuration, light can be guided to the second upper surface 53 of the heat spreader 5 by performing light irradiation from above the lens holder 9.

In addition, the QCL element 2 and the lens holder 9 are mounted on the same heat spreader 5. Incidentally, the QCL element 2 is mounted on the heat spreader 5 with the submount 7 and the heat sink 6 interposed therebetween. According to this configuration, since a base (heat spreader 5) on which the QCL element 2 and the lens holder 9 are placed is shared, when the heat spreader 5 expands or contracts because of heat, a relative movement of the lens holder 9 with respect to the QCL element 2 can be suppressed. As a result, the occurrence of an optical axis offset (offset of the central axis AX3 of the lens 8 with respect to the optical axis of the laser light L) caused by a temperature change in the package 3 can be suppressed.

In addition, the package 3 airtightly accommodates the QCL element 2, the lens 8, and the lens holder 9 described above. According to this configuration, since the effective region of the lens 8 disposed in the package 3 can be efficiently used, the size of the lens 8 can be reduced, and the size of the package 3 can be reduced.

Modification Examples

One embodiment of the present disclosure has been described above; however, the present disclosure is not limited to the above-described embodiment. For example, the material and the shape of each configuration are not limited to the material and the shape described above, and various materials and shapes can be adopted. In addition, some configurations included in the embodiment may be appropriately changed or omitted.

The shape of the lens holder is not limited to the shape of the lens holder 9 described above. For example, instead of the lens holder 9 described above, lens holders 9A to 9C shown in FIGS. 17 to 19 may be used.

As shown in FIG. 17, the lens holder 9A of a first modification example differs from the lens holder 9 in that a large-diameter hole 9Ab having a quadrangular shape is formed instead of the large-diameter hole 9b having a circular shape and the groove portions 9d are not formed (large-diameter hole 9Ab is formed in such a size as to include portions corresponding to the groove portions 9d). In such a manner, the large-diameter hole 9Ab may be formed in such a size as to accommodate the lens 8, and may not necessarily be formed in a circular shape. According to the large-diameter hole 9Ab, a sufficient space for the filling of the resin adhesive agent B1 can be secured at four corners of the large-diameter hole 9Ab without providing the groove portions 9d. From a different perspective, in the lens holder 9A, each of the portions corresponding to the four corners of the large-diameter hole 9Ab functions as a recess corresponding to the groove portion 9d of the lens holder 9. Incidentally, similarly to the large-diameter hole 9Ab, the small-diameter hole 9a may also be formed in a shape other than a circular shape (for example, the same quadrangular shape as that of the large-diameter hole 9Ab, a size smaller than the large-diameter hole 9Ab, or the like).

As shown in FIG. 18, the lens holder 9B of a second modification example differs from the lens holder 9 in that the lens holder 9B includes a top wall portion 91B of which an upper surface is formed in a circular shape (curved surface shape), instead of the top wall portion 91. In addition, in the lens holder 9B, since the top wall portion 91B is adopted, there is no space for forming the groove portion 9d provided on a top wall portion 91 side in the lens holder 9. For this reason, in the lens holder 9B, a pair of the groove portions 9d are formed on both respective sides in the Y-axis direction on a bottom wall portion 92 side. In such a manner, positions where the groove portions 9d are formed in the lens holder are not particularly limited. In addition, the number of the groove portions 9d is not particularly limited. In addition, in the lens holder 9B, a length of a portion of a wall portion along the X-axis direction excluding the bottom wall portion 92 is shorter compared to the wall portion 90 of the lens holder 9, the wall portion forming the large-diameter hole 9b. Specifically, the length of the portion along the X-axis direction is slightly shorter than a length of the lens 8 along the X-axis direction. According to such a configuration, since a portion that blocks UV light from above the lens holder 9B can be reduced, the UV light for curing the adhesive layer B2 can be more suitably guided to the heat spreader 5 side.

As shown in FIG. 19, the lens holder 9C of a third modification example differs from the lens holder 9 in that the lens holder 9C includes a top wall portion 91C having a shorter length along the X-axis direction than that of the top wall portion 91, instead of the top wall portion 91. The length of the top wall portion 91C along the X-axis direction is approximately half the length of the lens 8 along the X-axis direction. In addition, in the lens holder 9C, a length of a portion of a wall portion along the X-axis direction excluding the bottom wall portion 92 is the same as that of the top wall portion 91C, the wall portion forming the large-diameter hole 9b. Namely, the lens holder 9C is formed in a substantially L shape when viewed in the Y-axis direction. In the lens holder 9C, since a portion that blocks UV light from above the lens holder 9C is smaller than in the lens holder 9B, the UV light for curing the adhesive layer B2 can be more suitably guided to the heat spreader 5 side. In addition, as in the lens holder 9C, the wall portion of the lens holder forming the large-diameter hole 9b does not need to surround the entirety of the side surface 8b of the lens 8, and may be configured to surround only a part of an incident surface 8a side of the side surface 8b of the lens 8.

In addition, as in a quantum cascade laser device 1A according to a modification example shown in FIG. 20, the lens may not necessarily be accommodated in the package 3. The quantum cascade laser device 1A differs from the quantum cascade laser device 1 in that the quantum cascade laser device 1A includes a lens 8A externally attached to an outer side of the package 3, instead of including the lens 8 and the lens holder 9 in the package 3. Namely, the quantum cascade laser device 1A includes the lens 8A disposed on the outer side of the package 3 to concentrate or collimate the laser light L that has transmitted through the light-emitting window 11. In addition, because of the difference, the quantum cascade laser device 1A differs from the quantum cascade laser device 1, also in that the quantum cascade laser device 1A includes a heat spreader 5A configured such that the QCL element 2 can be disposed at a position close to the light-emitting window 11, instead of the heat spreader 5. As described above, the beam radiation angle of the laser light L is very large. For this reason, in order to make the light-emitting window 11 as small as possible while allowing all light fluxes of the laser light L to pass through the light-emitting window 11 to the outside of the package 3, it is desirable that the light-emitting window 11 and the emitting surface (end surface 2a) of the QCL element 2 that emits the laser light L are brought as close as possible to each other. For this reason, the quantum cascade laser device 1A not including the lens inside the package 3 includes the heat spreader 5A described above.

According to the quantum cascade laser device 1A, since the lens 8A is a member to be externally attached that is disposed on the outer side of the package 3, the disposition, replacement, and the like of the lens 8 can be flexibly performed. Further, as described above, the length w1 of the small-diameter hole 12 along the optical axis direction (X-axis direction) of the laser light L is shorter than the length w2 of the large-diameter hole 13 (refer to FIG. 5). According to this configuration, the light-emitting window 11 can be brought closer to the QCL element 2 compared to when the length w1 of the small-diameter hole 12 is equal to or longer than the length w2 of the large-diameter hole 13. Accordingly, even when the beam radiation angle of the laser light L emitted from the QCL element 2 is large, the laser light L can be incident on the light-emitting window 11 while a degree of the spread of the laser light L is reduced. As a result, the size of the light-emitting window 11 can be reduced, and the size of the package 3 can be reduced.

In addition, as described above, the emitting surface 15b of the window member 15 includes the fourth region A4 in which the anti-reflection film 152 is provided, and the fourth region A4 includes the first region A1 and is larger than the first region A1 when viewed in the X-axis direction. As in the quantum cascade laser device 1A, when the lens is not provided in the package 3 and the laser light L that is divergent light is incident on the window member 15, a region through which the laser light L passes on the incident surface 15a of the window member 15 is smaller than a region through which the laser light L passes on the emitting surface 15b of the window member 15. Therefore, as in this configuration, a region corresponding to a difference between the fourth region A4 and the first region A1 can be secured as the second region A2 by making the anti-reflection film 151 on an incident surface 15a side smaller than the anti-reflection film 152 on an emitting surface 15b side (namely, by making the first region A1 smaller than the fourth region A4). In such a manner, since the sizes of the first region A1, the second region A2, and the fourth region A4 are designed in consideration of the beam radiation angle of the laser light L, the size of the window member 15 can be reduced, and the size of the package 3 can be reduced.

In addition, in the embodiment, the emitting surface 15b of the window member 15 is substantially flush with the outer surface of the side wall 32, but the emitting surface 15b of the window member 15 may further protrude to the outside of the package 3 than the outer surface of the side wall 32. Namely, the thickness of the window member 15 may be larger than the length w2 of the large-diameter hole 13. In this case, the workability when the window member 15 is joined to the side wall 32 from the outside of the package 3 can be improved. In addition, as in the quantum cascade laser device 1A, when the lens 8A to be externally attached is attached to the emitting surface 15b of the window member 15, the workability of lens attachment can also be improved. In addition, the size of the package 3 can be reduced or the lens 8A can be reliably disposed close to the window member 15 by reducing the thickness of the side wall 32.

In addition, in the embodiment, as one example of the semiconductor laser element, the quantum cascade laser element (QCL element 2) has been exemplified, but as the semiconductor laser element to be accommodated in the package 3, a laser element other than the quantum cascade laser element may be used. In addition, the semiconductor laser element may be a distributed feedback (DFB) semiconductor laser element in which a diffraction grating structure is provided on an upper portion of an active layer.

In addition, in the embodiment, the package 3 that is a butterfly package has been exemplified, but the form of the package is not limited thereto. For example, the package may be a CAN package.

REFERENCE SIGNS LIST 1, 1A: quantum cascade laser device (semiconductor laser device), 2: quantum cascade laser element (semiconductor laser element), 2a: end surface (emitting surface), 3: package, 5, 5A: heat spreader, 8, 8A: lens, 8a: incident surface, 8b: side surface, 8c: emitting surface, 9, 9A, 9B, 9C: lens holder, 9a: small-diameter hole (first hole portion), 9b: large-diameter hole (second hole portion), 9c: counterbore surface, 9d: groove portion (recess), 11: light-emitting window, 12: small-diameter hole, 13: large-diameter hole, 14: counterbore surface, 15: window member, 15a: incident surface, 15b: emitting surface, 15c: side surface, 16: solder member, 31: bottom wall, 32: side wall, 33: top wall, 53: second upper surface (second attachment surface), 53a: protrusion (second protrusion), 91: top wall portion (second wall portion), 92: bottom wall portion (first wall portion), 92a: lower surface (first attachment surface), 92b: protrusion (first protrusion), 92c: cutout, 151: anti-reflection film (first anti-reflection film), 152: anti-reflection film (second anti-reflection film), 153: metal film, A1: first region, A2: second region, A3: third region, A4: fourth region, AX1, AX2, AX3: central axis, B1: resin adhesive agent, B2: adhesive layer, D: direction, L: laser light.

The invention claimed is:

1. A quantum cascade laser device comprising:
   a quantum cascade laser element;
   a lens disposed to face an emitting surface of the quantum cascade laser element that emits laser light; and
   a lens holder that holds the lens,
   wherein the lens holder includes:
      a first hole portion extending in an optical axis direction along an optical axis of the laser light;
      a second hole portion that is provided at a position farther from the quantum cascade laser element than the first hole portion, and that includes the first hole portion and is larger than the first hole portion when viewed in the optical axis direction; and
      a counterbore surface having an annular shape that connects the first hole portion and the second hole portion and that extends along a plane intersecting the optical axis direction,
   the lens includes:
      an incident surface on which the laser light is incident; and
      a side surface extending from an edge portion of the incident surface along the optical axis direction,
   at least a part of the side surface is fixed to an inner surface of the second hole portion through a resin adhesive agent in a state where the edge portion of the incident surface is in contact with the counterbore surface,
   a central axis of the first hole portion is eccentric from a central axis of the second hole portion,
   the side surface of the lens is positioned with respect to the inner surface of the second hole portion along a direction from the central axis of the second hole portion toward the central axis of the first hole portion, and
   a central axis of the lens is disposed at a position closer to the central axis of the first hole portion than to the central axis of the second hole portion.

2. The quantum cascade laser device according to claim 1, wherein the central axis of the lens substantially coincides with the central axis of the first hole portion, and
   an effective diameter of the lens substantially coincides with a diameter of the first hole portion.

3. The quantum cascade laser device according to claim 1, wherein a recess that reaches the counterbore surface along the optical axis direction is formed in the inner surface of the second hole portion, and
   the resin adhesive agent enters the recess.

4. The quantum cascade laser device according to claim 1, further comprising:
   a heat spreader on which the lens holder is mounted,
   wherein the lens holder includes a first attachment surface on which a plurality of first protrusions protruding to a heat spreader side are formed, and
   the plurality of first protrusions are joined to a second attachment surface of the heat spreader through an adhesive layer made of a photocurable resin.

5. The quantum cascade laser device according to claim 4, wherein a plurality of second protrusions protruding to a lens holder side are formed on the second attachment surface at positions corresponding to the plurality of first protrusions, and the plurality of first protrusions are joined to the plurality of second protrusions through the adhesive layer.

6. The quantum cascade laser device according to claim 4, wherein a first wall portion having the first attachment surface of the lens holder is provided with a through-hole or a cutout for guiding light to the second attachment surface of the heat spreader.

7. The quantum cascade laser device according to claim 6, wherein the lens holder includes a second wall portion facing the first wall portion through the second hole portion, and the second wall portion is formed not to overlap at least a part of the through-hole or the cutout provided in the first wall portion, when viewed in a direction in which the first wall portion and the second wall portion face each other.

8. The quantum cascade laser device according to claim 1, wherein the quantum cascade laser element and the lens holder are mounted on a same heat spreader.

9. The quantum cascade laser device according to claim 1, further comprising:

a package that airtightly accommodates the quantum cascade laser element, the lens, and the lens holder, wherein the package includes:

a bottom wall;

a side wall standing on the bottom wall and being formed in an annular shape to surround a region in which the quantum cascade laser element and the lens holder are accommodated, when viewed in a direction perpendicular to the bottom wall; and a top wall that closes an opening on an opposite side of the side wall from a bottom wall side, and a light-emitting window through which the laser light that has passed through the lens passes is provided on the side wall.

* * * * *